United States Patent
Tsuchimoto

(10) Patent No.: US 9,002,844 B2
(45) Date of Patent: Apr. 7, 2015

(54) GENERATING METHOD, GENERATING SYSTEM, AND RECORDING MEDIUM

(71) Applicant: Fujitsu Limited, Kawasaki (JP)

(72) Inventor: Yuichi Tsuchimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 182 days.

(21) Appl. No.: 13/740,585

(22) Filed: Jan. 14, 2013

(65) Prior Publication Data

US 2013/0198198 A1 Aug. 1, 2013

(30) Foreign Application Priority Data

Jan. 31, 2012 (JP) ................................. 2012-019283

(51) Int. Cl.
G06F 7/00 (2006.01)
G06F 17/30 (2006.01)

(52) U.S. Cl.
CPC ................................. *G06F 17/30321* (2013.01)

(58) Field of Classification Search
None
See application file for complete search history.

(56) References Cited

U.S. PATENT DOCUMENTS

| 2013/0262854 A1* | 10/2013 | Gladwin et al. | 713/150 |
| 2013/0297658 A1* | 11/2013 | Guarraci | 707/797 |
| 2013/0297788 A1* | 11/2013 | Itoh | 709/224 |
| 2013/0304745 A1* | 11/2013 | Dhuse et al. | 707/741 |

FOREIGN PATENT DOCUMENTS

| JP | 2000-200298 | 7/2000 |
| JP | 2010-123038 | 6/2010 |

* cited by examiner

*Primary Examiner* — Khanh Pham
*Assistant Examiner* — Azam Cheema
(74) *Attorney, Agent, or Firm* — Staas & Halsey LLP

(57) ABSTRACT

A computer-readable recording medium stores a program for causing an apparatus to execute a procedure. The procedure includes: regarding each data in a data set having a key and a value corresponding to the key, calculating a key characteristic value of the data as an index value indicating an existence of the key in the data and another key included in the value based on the value of the key and the value of the other key included in the value; generating a segment in which data blocks of which the calculated key characteristic values are similar to each other are grouped in one group; and setting a storage destination of the data in the generated segment.

18 Claims, 18 Drawing Sheets

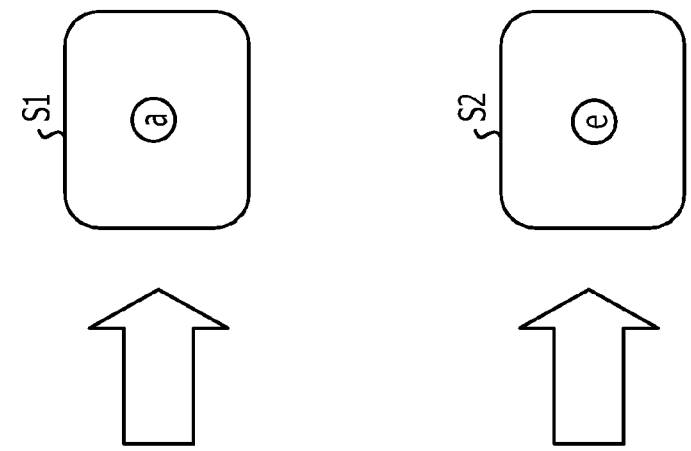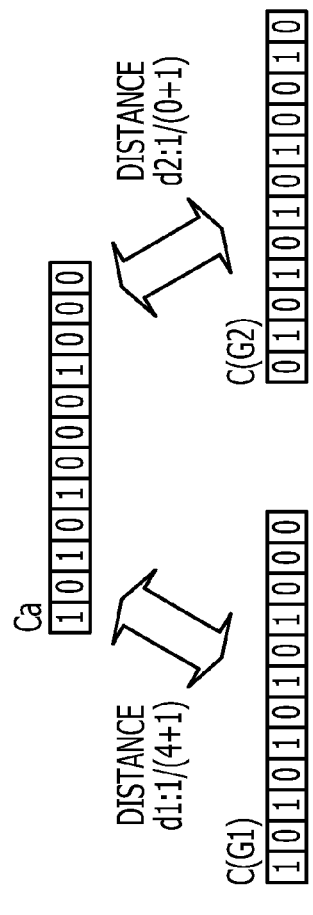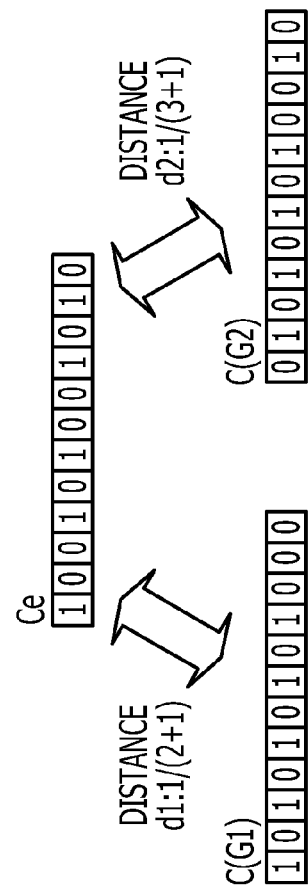
FIG. 5A    FIG. 5B

FIG. 6

| SEGMENT NAME |
|---|
| STORAGE DESTINATION INFORMATION |
| THE NUMBER OF DATA |
| SUBGRAPH CHARACTERISTIC VALUE |
| POINTER TO CHILD SEGMENT |

FIG. 9

| KEY | KEY CHARACTERISTIC VALUE |
|---|---|
| k1 | ck1 |
| k2 | ck2 |
| k3 | ck3 | 
| ⋮ | ⋮ |

TC

US 9,002,844 B2

GENERATING METHOD, GENERATING SYSTEM, AND RECORDING MEDIUM

CROSS-REFERENCE TO RELATED APPLICATIONS

This application is based upon and claims the benefit of priority of the prior Japanese Patent Application No. 2012-19283 filed on Jan. 31, 2012, the entire contents of which are incorporated herein by reference.

FIELD

The embodiments discussed herein are related to a generating method, a generating system, and a recording medium.

BACKGROUND

There is a data managing method called "distributed Key-Value Store." The distributed Key-Value Store manages association of a key and a Value included in the data. A user is able to register the association of the keys and the Values or reference the Value based on the key. The key is, for example, fixed identification information or a pointer. The Value is, for example, variable data such as a web page or text data. The distributed Key-Value Store includes a plurality of servers. The data as a pair of the key and the Value is allocated in one of the servers or in some servers according to set redundancy. An allocation destination of the data is determined based on a hash value of the key or the like.

There is disclosed a related web page discovering device that discovers a related web page group of which the characteristics are similar to each other. The related web page discovering device expresses a network where a web page is a node and a hyperlink is an edge in an adjacency matrix form and calculates a characteristic amount based on a coupling state of the node and the edge around the node. The related web page discovering device references a web page character amount database, calculates a web page related to a page as a processing target, and outputs the related web page group.

There is disclosed an automatic allocating method for converting a circuit as information having a structure into a small-sized graph and matching the small graphs. According to the automatic allocating method, circuit data having a part list and a net list and the allocation thereof are stored in a database, and another circuit data and the circuit data in the database are converted into a graph having nodes and edges. According to the automatic allocating method, matching of the graphs is performed to search for circuit data with a high matching performance, and another circuit data is allocated along allocation data corresponding to the circuit data.

As with the distributed Key-Value Store, when the data is distributed and managed in a plurality of servers, the number of disk access may be reduced by storing, in one server, the related data with a high possibility of being continuously referenced.

SUMMARY

According to an aspect of the invention, a computer-readable recording medium stores a program for causing an apparatus to execute a procedure. The procedure includes: regarding each data in a data set having a key and a value corresponding to the key, calculating a key characteristic value of the data as an index value indicating an existence of the key in the data and another key included in the value based on the value of the key and the value of the other key included in the value; generating a segment in which data blocks of which the calculated key characteristic values are similar to each other are grouped in one group; and setting a storage destination of the data in the generated segment.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIGS. 5A and 5B are explanatory diagrams illustrating an example of local division of a key using a key characteristic value and a subgraph characteristic value;
FIG. 6 is an explanatory diagram illustrating a data structure of a segment included in tree structure data;
FIG. 9 is an explanatory diagram illustrating an example of storage contents of a key characteristic value table TC illustrated in FIG. 8.

DESCRIPTION OF EMBODIMENTS

With reference to the attached diagrams, a generating program, a generating method, and a generating system according to the present invention will be described in detail below. The prior art has a problem that grouping of related data is difficult. For example, if values of keys are not related to each other, the relevance of the data may not be specified based on the values of the keys. Thus, the related data is difficult to be stored in the same server. The same can be said to the case where the attributes of the keys are not related to each other.

According to the present invention, by detecting the relevance of the data based on the association of the keys in the data, grouping of the related data is achieved.

<Example of Local Division>

Data processing may have "a tendency to continuously access related data." For example, in a Social Network Service (SNS), when information of a user is referenced, there is a high probability that the information of the friends of the user is continuously referenced. Such tendency is called "locality." When the data is distributed into a plurality of servers to be managed, the number of disk access may be reduced by storing the data having the locality in the same server.

According to the embodiment, for example, in the distributed Key-Value Store, the data groups of which the values of the keys have no relevance are grouped based on the data having the locality. The same can be said to the data groups of which the attributes of the keys have no relevance. Accordingly, the present embodiment manages all key spaces in the data groups by introducing a concept called "segment." The data groups are divided by the segment and then assigned to distribution devices. The distribution device is a computer that holds the data assigned from the data groups.

The size of the segment may be chosen based on the following viewpoint. The number of segments is equal to or larger than the number of distribution devices. The larger the number of segments, the more equalized the load distribution is. The larger the size of the subgraph included in the segment is, the smaller the cost of access to a memory device of the distribution device is. The entire space of the segment is recursively divided into two. Therefore, the data groups are managed in a binary tree structure.

Figure 1:
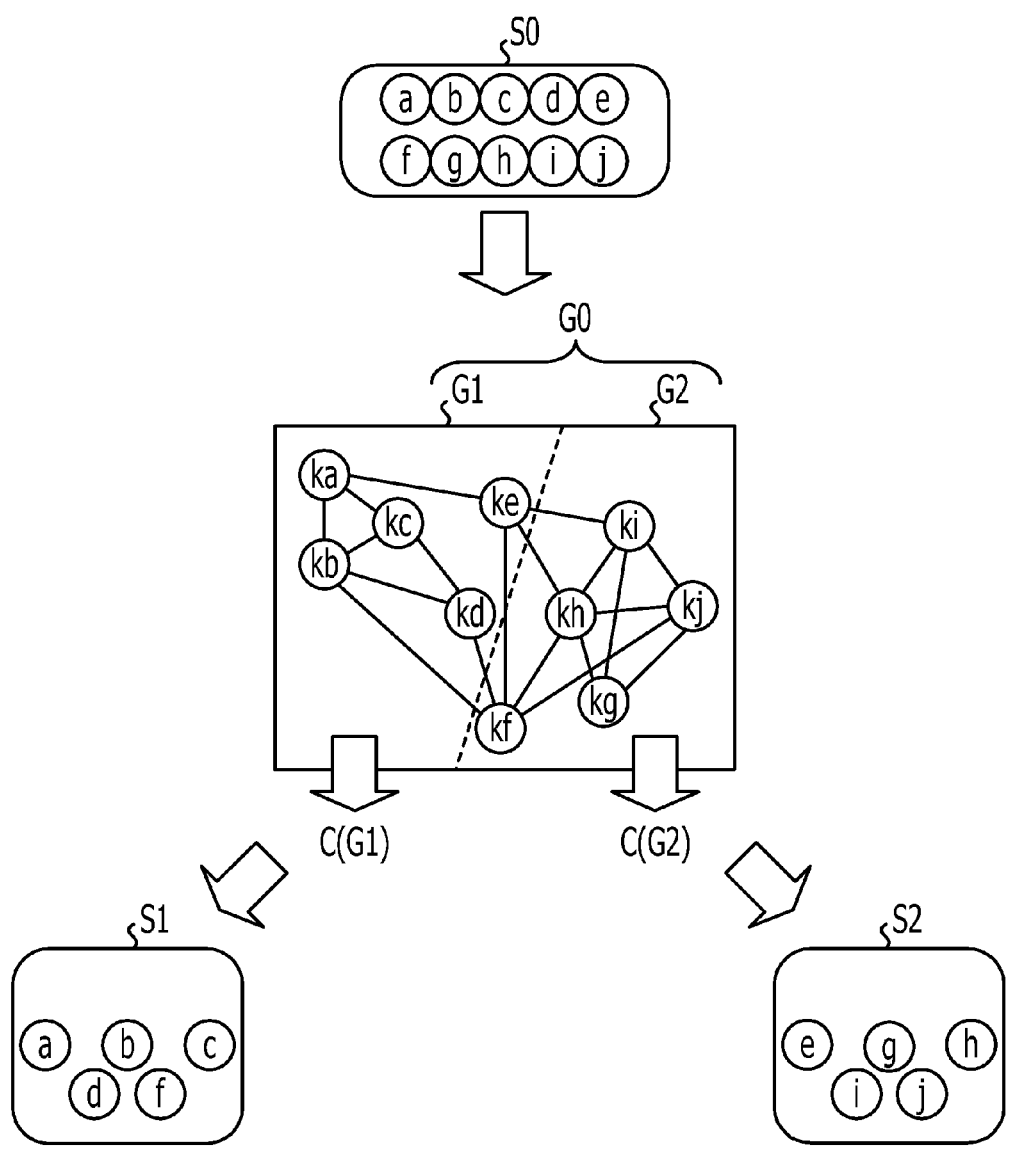
FIG. 1 is an explanatory diagram illustrating an example of local division.

FIG. 1 is an explanatory diagram illustrating an example of local division. According to the local division, as described above, a segment is divided into two segments obtained by grouping the data having the locality. The minimum unit of the data is a key and a Value. The key is a fixed ID given from outside. The value of the key is a random value. In FIG. 1, data a to j belonging to a segment S0 are subjected to the local division to be divided into a child segment S1 and a child segment S2.

According to the local division, a graph G0 is generated where the data a to j in the segment S0 are nodes and the relations between the nodes are edges (lines coupling the nodes), and the graph G0 is divided into a subgraph G1 and a subgraph G2. In the graph G0, keys ka to kj of the data a to j are expressed as nodes. A relation between a key and another key in the Value is expressed as an edge. The information of the edge in the graph G0 may not be estimated based on the value of the key. The graph division is performed in such a way that, for example, the number of nodes is evenly divided and that the number of edges crossing the border is reduced as much as possible. In this case, there is a high probability that the adjacent nodes that are directly coupled to each other with the edge are assigned to the same subgraph. For example, Kernighan-Lin algorithm is employed as the graph division.

Here, subgraph characteristic values C (G1) and C (G2) are calculated for the subgraphs G1 and G2, respectively. The subgraph characteristic value is an index value indicating the existence of each key indicating a node group in the subgraph. The subgraph characteristic value will be described in FIG. 4.

In the local division, the key characteristic value is obtained for each of the data a to j in the segment S0. The key characteristic value is an index value indicating the existence of the key in the data and another key included in the Value in the data. The key characteristic value will be described in FIG. 3. The data a to j are grouped by the data of which the key characteristic thereof is closer to the subgraph characteristic values C (G1) or the subgraph characteristic value (G2). In the example illustrated in FIG. 1, the segment S1 that is local-divided from the segment 0 is a data group of which the key characteristic values are closer to the subgraph characteristic value C (G1), for example, the data a to d, and the data f. Furthermore, the segment S2 that is local-divided from the segment S0 is a data group of which the key characteristic values are closer to the subgraph characteristic value C (G2), for example, the data e and the data g to j.

Figure 2:
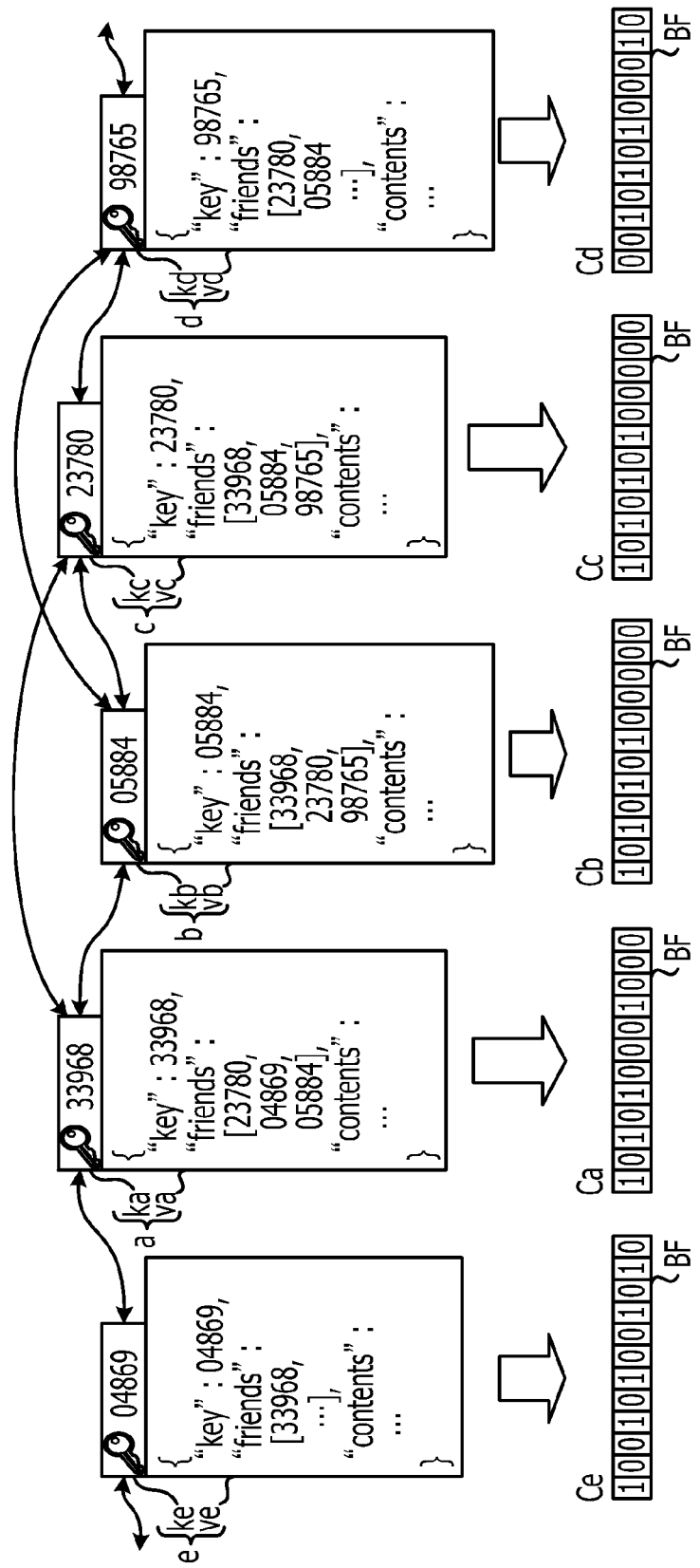
FIG. 2 is an explanatory diagram illustrating an example of data.

FIG. 2 is an explanatory diagram illustrating an example of the data. Each of the data a to e includes a combination of a key and a Value. The combinations are {ka, va} to {ke, ve}. Each of the Values va to ve includes other keys. For example, the Value va of the data a includes a key kb (=05884), a key kc (=23780), and a key ke (=04869). Therefore, in the graph G0 illustrated in FIG. 1, the key ka is associated with the keys kb, kc, and ke by the edges.

The key characteristic values Ca to Ce are calculated based on the data a to e. The key characteristic values Ca to Ce are calculated by using bloom filters BF with the same bit width. Specifically, for example, in the bloom filter BF, each bit is set in a position of the value of a reminder obtained by dividing each hash value of the value of the key in the data and of another key in the Value.

Figure 3:
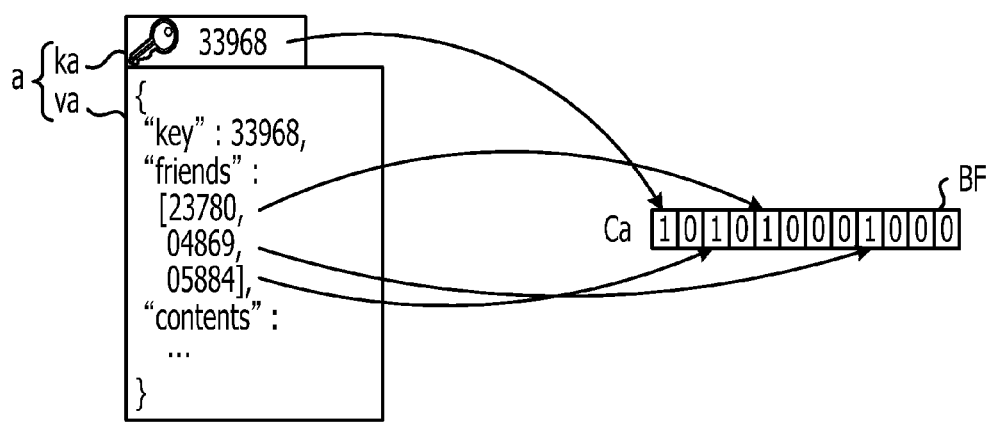
FIG. 3 is an explanatory diagram illustrating an example of a key characteristic value.

FIG. 3 is an explanatory diagram illustrating an example of the key characteristic value. FIG. 3 will be described by using the data a. As for the data a, the key ka (=33968), the key kb in the Value va (=05884), the key kc (=23780), the key ke (=04869) are given to a hash function, respectively. The bits are set in the positions of the reminder obtained by dividing the hash value obtained by the hash function by the bit width of the bloom filter BF, respectively.

The bits are set in this manner, in case of the respective key characteristic values Ca to Ce, the bits are set in the same position regarding the same key. Due to False positive of the bloom filter BF, the bits may be set in the same position even though the keys are not the same keys.

FIG. 2 illustrates the key characteristic values Ca to Ce. The subgraph characteristic values C (G1) and C (G2) illustrated in FIG. 1 may be calculated by using the bloom filter BF. In case of the key characteristic value, the bit of the bloom filter BF is set by using the value of the key in the data and the value of the other key in the Value. On the contrary, in case of the subgraph characteristic value, the bit is set by using the value of each key in the subgraph. The bit width of the bloom filter BF used in the calculation of the subgraph characteristic value is similar to the bit width of the bloom filter BF used in case of the key characteristic value, and the same hash function is used.

Figure 4:
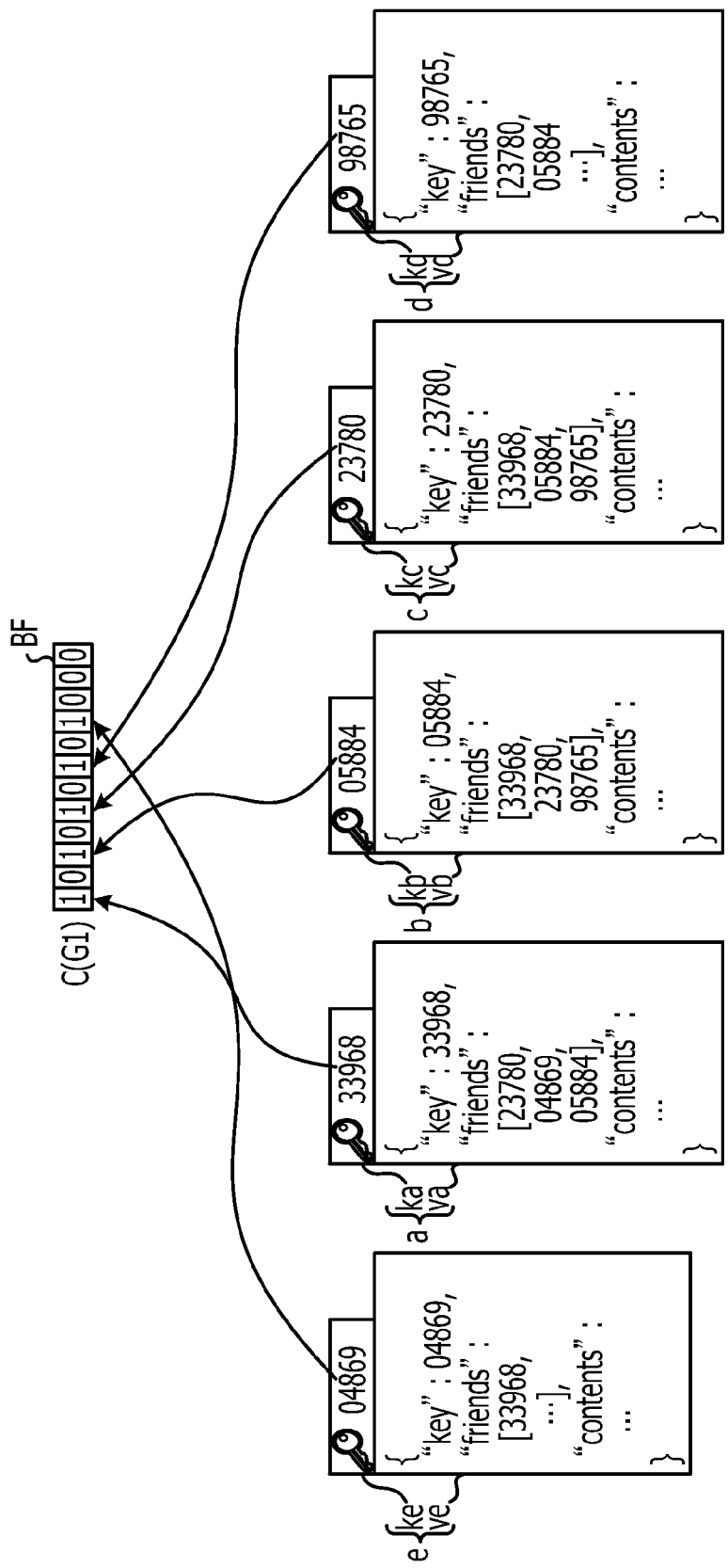
FIG. 4 is an explanatory diagram illustrating an example of a subgraph characteristic value.

FIG. 4 is an explanatory diagram illustrating an example of the subgraph characteristic value. FIG. 4 illustrates the subgraph characteristic value C (G1) of the subgraph G1 illustrated in FIG. 1. In case of the subgraph G1, each value of the keys ka to ke is given to the hash function. The bit is set in the position of the reminder obtained by dividing the hash value obtained from the hash function by the bit width of each of the bloom filters BF. Similarly, the subgraph G2 may obtain the subgraph characteristic value C (G2) by using each value of the keys kf to kj.

FIGS. 5A and 5B are explanatory diagrams illustrating the local division of the key using the key characteristic value and the subgraph characteristic value. FIG. 5A is an example using the key characteristic value Ca of the data a and the subgraph characteristic values C (G1) and C (G2). A distance is used as an example indicating the height of the locality between the data and the subgraph. The shorter the distance is, the higher the locality is. The distance is determined by the number of bits set on common positions according to the key characteristic value and the subgraph characteristic value.

For example, the number of bits set on common positions according to the key characteristic value Ca and the subgraph characteristic value C (G1) is "4." Accordingly, a distance d1 between the key ka and the subgraph G1 is d1=1/(4+1)=1/5. On the other hand, the number of bits set on common positions according to the key characteristic value Ca and the subgraph characteristic value C (G2) is "0." Accordingly, a distance d2 between the key characteristic value Ca and the subgraph characteristic value C (G2) is d2=1/(0+1)=1. That is, according to d1<d2, the data a having the key ka has locality with the subgraph G1 rather than the subgraph G2. Therefore, the data a having the key ka belongs to the segment SL.

FIG. 5B is an example using the key characteristic value Ce of the data e and the subgraph characteristic values C (G1) and C (G2). The number of bits set on common positions according to the key characteristic value Ce and the subgraph characteristic value C (G1) is "2." Therefore, the distance d1 between the key characteristic value Ce and the subgraph characteristic values C (G1) is d1=1/(2+1)=1/3. On the other hand, the number of bits set on common positions according to the key characteristic value Ce and the subgraph characteristic value C (G2) is "3." Accordingly, the distance d2 between the key characteristic value Ce and the subgraph characteristic value C (G2) is d2=1/(3+1)=1/4. That is, according to d1>d2, the data e having the key ke has the locality with the subgraph G2 rather than the subgraph G1. Therefore, the data e having the key ke belongs to the segment S2.

As described above, regarding the data a and the data b that are adjacent to each other by being coupled with an edge, the key ka of the data a and the key kb of the data b are embedded in the key characteristic value Ca of the data a by the bloom filter BF whether the data a and the data b belong to the same subgraph or not. The key ka of the data a and the key kb of the data b are embedded in the key characteristic value Cb of the data b by the bloom filter BF.

The graph division has a characteristic indicating that "the nodes that are adjacent to each other by being coupled with the edge have a high probability of being assigned to the same subgraph." According to this characteristic, the keys ka to ke of the data a to e are embedded, by the bloom filter BF, in the subgraph characteristic value C (G1) of the subgraph G1 having the data a to e.

Therefore, compared to the key characteristic value with the subgraph characteristic value, the number of bits as "1" in common stochastically increases, and the distance as the inverse number is stochastically shortened. In this manner, according to the local division, the data groups a to j are local-divided into the segment SL and the segment S2 by dividing the data to a segment of which the distance is shorter. Especially, by applying the bloom filter BF to the key characteristic value and the subgraph characteristic value, the size of the data may be reduced more than a case where the key group is maintained. Thus, the memory may be reduced. When the memory device is assigned to each segment, the access to the data in the same segment may be made by accessing the same memory device. As a result, the access frequency may be reduced.

The state of the local division is maintained as the tree structure data having a binary tree structure. The tree structure data will be described using the diagrams.

FIG. 6 is an explanatory diagram illustrating a data structure of a segment included in the tree structure data. The segment holds a segment name, storage destination information, the number of data, a subgraph characteristic value, and a pointer to a child segment. The segment name is information that identifies a segment. The storage destination information is identification information of a storage destination of the data that is specified by the key in the segment. The address of a storage destination server is given as an example.

The number of data is the number of keys in the segment. The subgraph characteristic value is obtained by the graph division of a parent segment when the segment is local-divided from the parent segment. For example, the subgraph characteristic value C (G1) is obtained in case of the segment SL illustrated in FIG. 1. The pointer to a child segment is information that specifies the segment as a branch destination when the segment is subjected to the local division. A child segment name is given as an example.

Figure 7C:
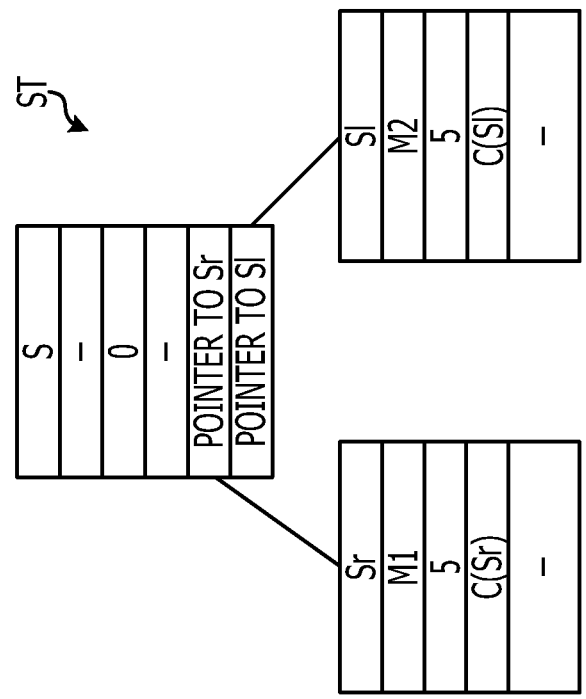
FIGS. 7A, 7B, 7C, 7D, and 7E are explanatory diagrams illustrating a structure example of the tree structure data by the local division.
Figure 7B:
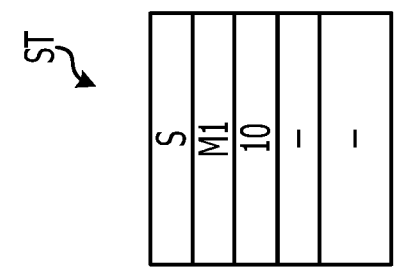
Figure 7A:
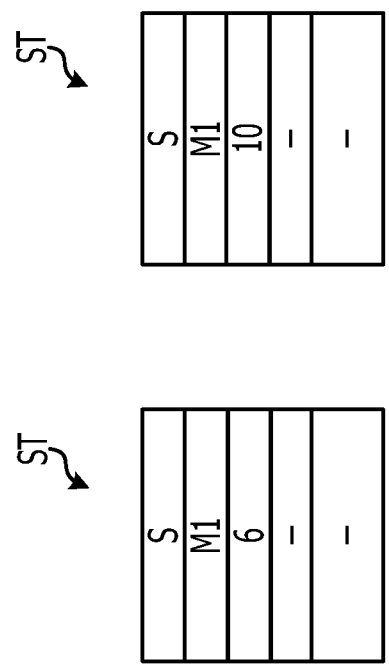

FIGS. 7A, 7B, 7C, 7D, and 7E are explanatory diagrams illustrating a structure example of the tree structure data by the local division. FIG. 7A illustrates a tree structure data ST having the segment S. The assignment data group of the segment S is stored in the memory device of a distribution device M1. In this case, since the number of data of the segment S is "6," six blocks of data are registered in the memory device. FIG. 7A illustrates an initial state where the local division is never performed, and no subgraph characteristic value exists.

FIG. 7B illustrates a state of the tree structure data ST of which the number of data is increased from the state illustrated in FIG. 7A. In FIG. 7B, the number of data is "10." In the upper limit of the number of data in the segment is "10." The number of data of the segment S reaches "10" as the upper limit, so that the local division is performed.

FIG. 7C illustrates a state of the tree structure data ST where the local division is performed from the state illustrated in FIG. 7B. The segment S is local-divided into a segment Sr and a segment Sl. Due to the local division, no assignment data exists in the segment S. That is, the number of data becomes "0," and "M1" as the storage destination information is deleted. Instead, due to the local division, the segment S stores the pointer to the segment Sr and the pointer to the segment Sl.

Due to the local division of the segment S as illustrated in FIG. 5, five blocks of data out of ten blocks of data are assigned to the segment Sr, five blocks of data out of ten blocks of data are assigned to the segment Sl. At time of the local division of the segment S, the subgraph characteristic values C (Sr) and C (Sl) of the subgraph divided based on the assignment data group of the segment S are assigned to the segment Sr and the segment Sl, respectively.

The five blocks of assignment data in the segment Sr are stored in the memory device of the distribution device M1 that is equivalent to the segment S. On the other hand, the five blocks of assignment data in the segment Sl are stored in the memory device of the distribution device M2 that is different from the distribution device M1. Therefore, the storage destination information of the segment Sr is "M1, the storage destination information of the segment Sl is "M2." That is, as for the assignment data group of the segment Sr, the data transfer is not typically desired.

Figure 7D:
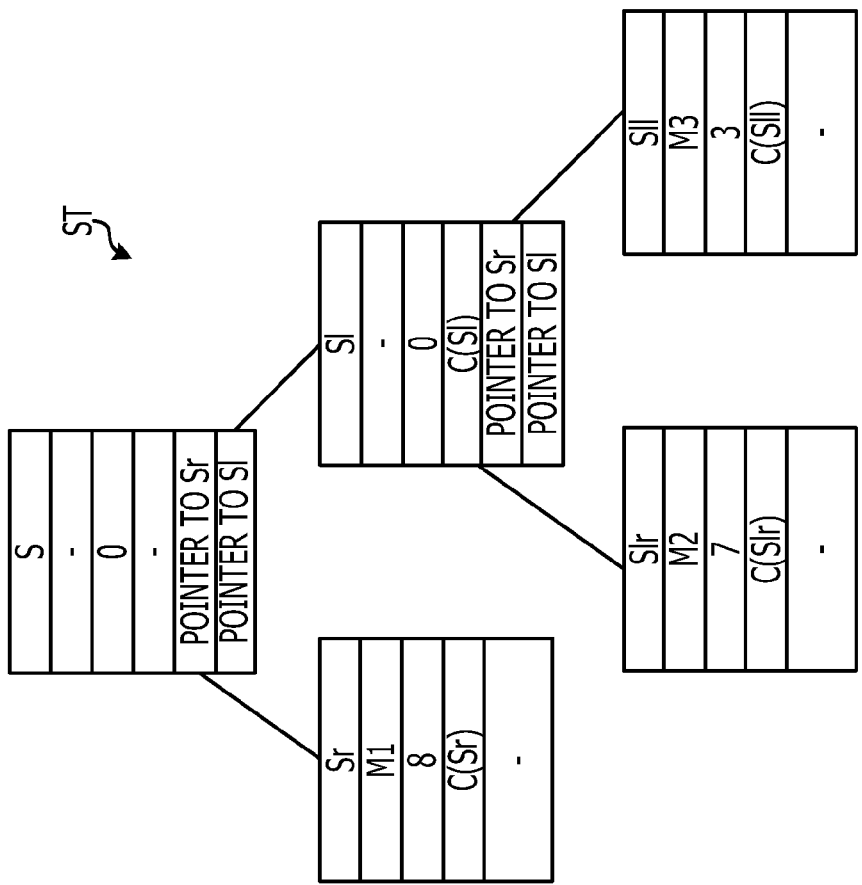

FIG. 7D illustrates a state of the tree structure data ST of which the number of nodes is increased from the state illustrated in FIG. 7C. In FIG. 7D, the number of data in the segment Sr is "8," and the number of data in the segment Sl is "10." Since the number of data in the segment Sl reaches "10" as the upper limit, the local division is performed.

Figure 7E:
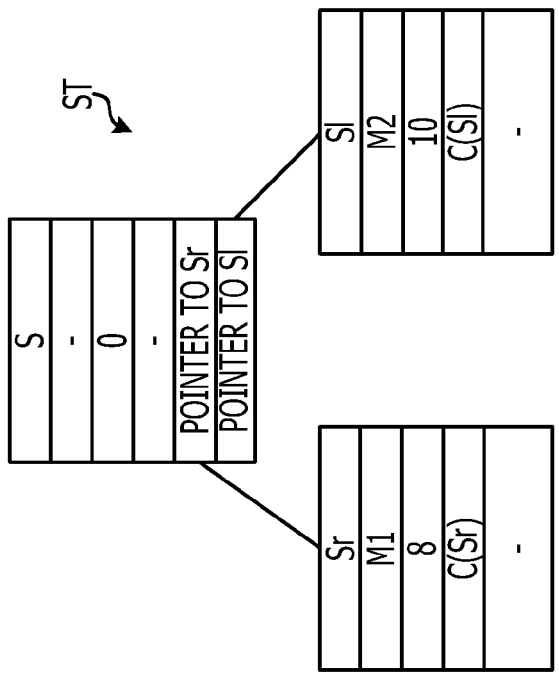

FIG. 7E illustrates a state of the tree structure data ST where the local division is performed from the state illustrated in FIG. 7D. The segment Sl is local-divided into a segment Slr and a segment Sll. Due to the local division, no belonging key exists in the segment Sl. That is, the number of data becomes "0," and "M2" as the storage destination information is deleted. Instead, due to the local division, the segment Sl stores the pointer to the segment Slr and the pointer to the segment Sll. Unlike the segment S, the segment Sl is not a route of the tree structure data ST. Thus, the subgraph characteristic value C (Sl) is held.

Due to the local division of the segment Sl as illustrated in FIGS. 5A and 5B, seven blocks of data out of ten blocks of data are assigned to the segment Slr, and three blocks of data out of ten blocks of data are assigned to the segment Sll. At time of the local division of the segment Sl, the subgraph characteristic values C (Slr) and C (Sll) of the subgraph divided based on the assignment data group of the segment Sl are assigned to the segment Slr and the segment Sll, respectively.

The seven blocks of assignment data of the segment Slr are stored in the memory device of the distribution device M2 that is equivalent to the segment Sl. On the other hand, the three blocks of assignment data of the segment Sll are stored in the memory device of the distribution device M3 that is different from the distribution device M2. Therefore, the storage destination information of the segment Slr is "M2," and the storage destination information of the segment Sll is "M3."

That is, as for the assignment data group of the segment Sr, the data transfer is not typically performed. In this case, the data group of which the number of data is smaller is transferred. Thus, compared to the case of transferring the data group of which the number of data is larger, a data transfer amount may be reduced, and transferring processing may be effective.

In this manner, in each segment, the local division is recursively performed every time the number of data reaches the upper limit, and the tree structure data ST is layered. That is, in the segment as a leaf of the tree structure data ST, the distribution device as a storage destination may be specified based on the storage destination information. For example, in FIG. 7E, the segments Sr, Slr, and Sll are leaves. Therefore, when the search in the tree structure data ST reaches the leaf, the data group stored in the distribution devices M1, M2, and M3 as the storage destination may be accessed.

The search in the tree structure data ST illustrated in FIG. 7E will be described below. For example, in the case where the key characteristic value of a block of data is Ck, it is determined to take either the segments Sr or the segment Sl as the branch destination from the segment S that is a root. The determination is made based on comparison of the key characteristic value Ck and the segment characteristic values C (Sr) and C (Sl) of the segments Sr and Sl. That is, if the distance between the key characteristic value Ck and the segment characteristic value C (Sr) is shorter than the distance between the key characteristic value Ck and the segment characteristic value C (Sl), the route reaches the segment Sr as a leaf.

On the other hand, the distance between the key characteristic value Ck and the segment characteristic value C (Sl) is shorter than the distance between the key characteristic value Ck and the segment characteristic value C (Sr), the route is determined to take either the segment Slr or the segment Sll as the branch destination. When the search is performed as described above, the route reaches one of the segment Slr and the segment Sll that eventually becomes a leaf.

<Example of System Structure>

Figure 8:
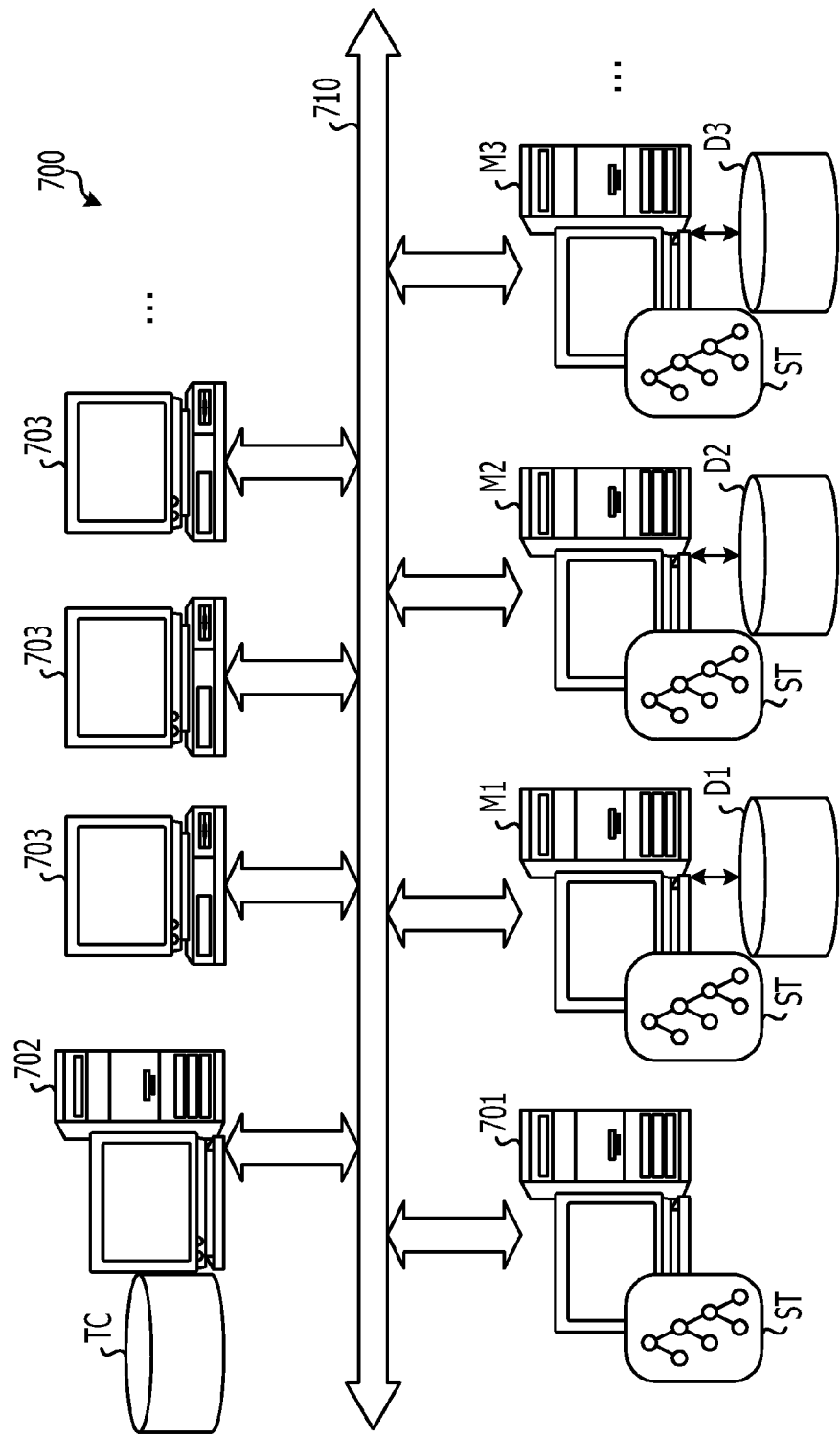
FIG. 8 is an explanatory diagram illustrating a system configuration example of a distribution system.

FIG. 8 is an explanatory diagram illustrating a system structure example of the distribution system. A distribution system 700 has a plurality of computers. The distribution system 700 and the computers are mutually coupled in a network such as Local Area Network, Wide Area Network, and the Internet. In FIG. 8, the LAN is given as an example, and the computers are coupled to each other via a bus 710.

A first management device 701 is a computer that manages the entire distribution system 700. The first management device 701 calculates the key characteristic value. The first management device 701 holds the tree structure data ST. The first management device 701 receives a request from a client and then replies a response according to the request.

A second management device 702 is a computer that holds a key characteristic value table TC in which the keys are associated with the key characteristic values. The second management device 702 receives the key characteristic value that is calculated by the first management device 701 and the key as the calculation source and then registers the key characteristic value and the key as a new record of the key characteristic value table TC. When receiving the key from the first management device 701, the second management device 702 refers to the key characteristic value table TC, reads out the key characteristic value associated with the received key, and returns the key characteristic value to the first management device 701.

In the distribution system 700, the first management device 701, the second management device 702, the distribution devices M1, M2, M3, etc., the memory devices D1, D2, D3, etc. are included in the generating system for generating the tree structure data ST. The generation of the tree structure data ST may be achieved in one computer that includes functions of the first management device 701, the second management device 702, and the distribution device M.

FIG. 9 is an explanatory diagram illustrating an example of storage contents of the key characteristic value table TC illustrated in FIG. 8. In FIG. 9, the key characteristic table TC stores the keys in association with the key characteristic values. As described above, the first management device 701 and the second management device 702 serve as different computers. However, a single computer may achieve the above-described processing.

As illustrated in FIG. 8, the distribution devices M1, M2, M3, etc. (hereinafter, a distribution device is referred to as "distribution device M") have the memory devices D1, D2, D3, etc. (hereinafter, the memory device of the distribution device M is referred to as "memory device D"), respectively. The distribution device M stores, in the memory device D, or reads out the data having the key and the Value or the tree structure data ST. For example, a flash memory, a magnetic disk, and a magnetic tape are given as an example of the memory device D.

When receiving the key, the distribution device M reads out the Value corresponding to the key from the memory device D and then returns the Value to a client 703 at the request source. The distribution device M performs increasing/decreasing processing of the number of data in the segment to which the distribution device M is assigned in the tree structure data ST. The segment to which the distribution device M is a segment in which the address of the distribution device M is registered in the storage destination information.

In the example illustrated in FIG. 7E, the distribution device M1 is assigned to the segment Sr, the distribution device M2 is assigned to the segment Slr, and the distribution device M3 is assigned to the segment Sll. When the number of data reaches the upper limit, the distribution device M performs the local division as illustrated in FIGS. 5A, 5B, 7A, 7B, 7C, 7D, and 7E.

At time of the local division, the distribution device M performs the data transfer. When the distribution device M performs the increasing/decreasing processing of the number of data or the local division, the tree structure data ST is updated. Thus, the updated tree structure data ST is distributed to another distribution device M or the first management device 701. As a result, the distribution system 700 may hold the latest tree structure data ST.

The client 703 is a computer that transmits a request to the first management device 701 or receives a response from the first management device 701. The client 703 transmits a key corresponding to the Value to be referenced as a reference request of the Value to the first management device 701. Accordingly, the Value is received from the first management device 701. To register the data, the client 703 transmits registration target data to the first management device 701. Accordingly, when the storage to the distribution device is successful, a registration completion notice is received from the first management device 701.

<Example of Hardware Structure of Computer>

Figure 10:
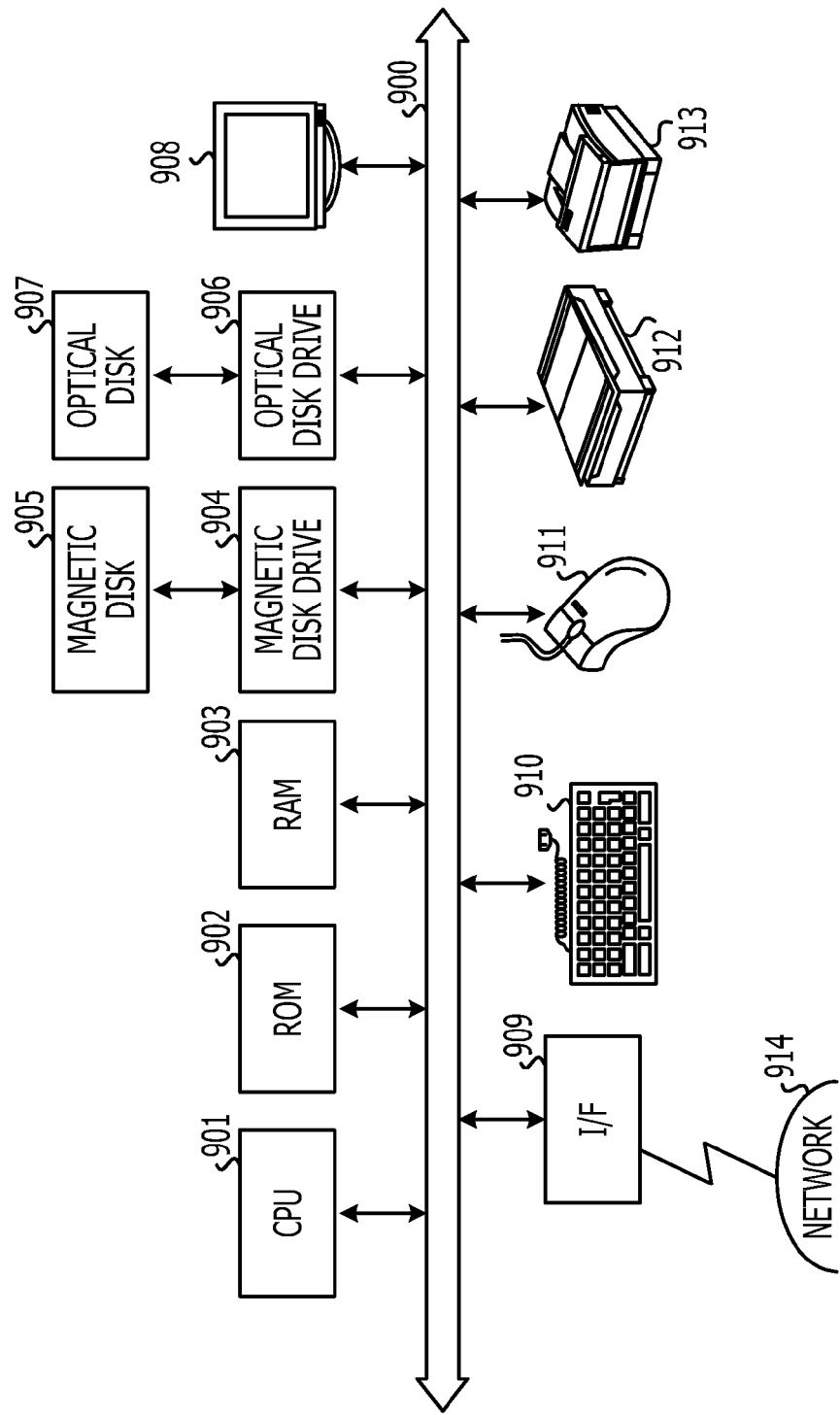
FIG. 10 is a block diagram illustrating a hardware structure example of a computer illustrated in FIG. 8.

FIG. 10 is a block diagram illustrating an example of a hardware structure of the computer illustrated in FIG. 8. In FIG. 10, the computer (the first management device 701, the second management device 702, the client 703, and the distribution device M) includes a Central Processing Unit (CPU) 901, a Read Only Memory (ROM) 902, a Random Access Memory (RAM) 903, a magnetic disk drive 904, a magnetic disk 905, an optical disk drive 906, an optical disk 907, a display 908, an interface (I/F) 909, a keyboard 910, a mouse 911, a scanner 912, and a printer 913. The respective components are coupled to each other via a bus 900.

The CPU 901 controls the entire computer. The ROM 902 stores a program such as a boot program and the like. The RAM 903 is used as a work area of the CPU 901. The magnetic disk drive 904 controls read/write of the data with respect to the magnetic disk 905 according to the control of the CPU 901. The magnetic disk 905 stores the data written under control of the magnetic disk drive 904.

The optical disk drive 906 controls the read/write of the date with respect to the optical disk 907 according to the control by the CPU 901. The optical disk 907 stores the data written under control of the optical disk drive 906 or causes the computer to read out the data stored in the optical disk 907.

The display 908 displays data such as a document, an image, and function information as well as a cursor, an icon, and a tool box. For example, a CRT, a TFT liquid-crystal display, or a plasma display may be employed as the display 908.

The interface (herein after referred to as I/F) 909 is coupled to the network 914 such as LAN, WAN, and the Internet and is coupled to another device through the network 914. The I/F 909 controls the network 914 and the internal interface and controls the input and output of the data from an external device. For example, a modem, a LAN adaptor, or the like may be employed as the I/F 909.

The keyboard 910 having keys used to input data such as letters, numbers, and various instructions. The keyboard 910 may include a touch panel-type input pad or a numerical keypad. The mouse 911 may move the cursor, select a range, move a window, or change the size of the window. A trackball or a joystick having the functions equivalent to a pointing device may be employed.

The scanner 912 optically reads an image and scans image data into the computer. The scanner 912 may have an Optical Character Reader (OCR) function. Further, the printer 913 prints image data or document data. For example, a laser printer or an ink-jet printer may be employed as the printer 913.

<Example of Data Reference>

Figure 11:
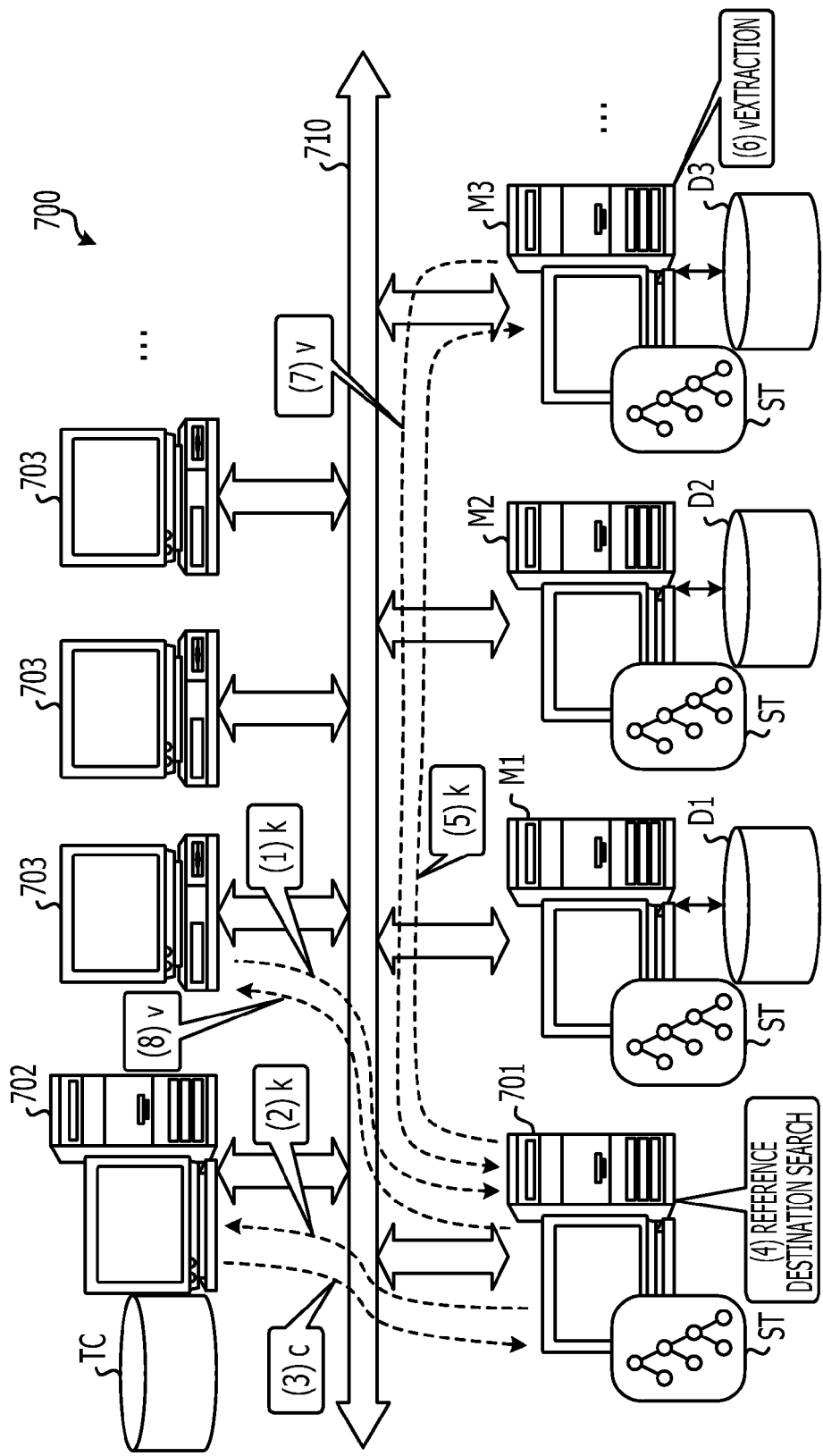
FIG. 11 is an explanatory diagram illustrating a data reference example.

FIG. 11 is an explanatory diagram illustrating an example of data reference.

Operation (1): The client 703 transmits the reference request that includes the key k to the first management device 701.

Operation (2): When receiving the reference request that includes the key k, the first management device 701 transmits the key k to the second management device 702.

Operation (3): The second management device 702 returns the key characteristic value c corresponding to the key k to the first management device 701.

Operation (4): By searching in the tree structure data ST with the key characteristic value c, the first management device 701 specifies the distribution device M as the storage destination of the Value v corresponding to the key k. In this case, the distribution device M3 is specified.

Operation (5): The first management device 701 transmits the key k to the distribution device M3.

Operation (6): The distribution device M3 extracts the Value v corresponding to the key k from the memory device D3.

Operation (7): The distribution device M3 returns the extracted Value v to the first management device 701.

Operation (8): The first management device 701 returns the Value v to the client 703 at the reference request source. Therefore, the client 703 may obtain the Value v to be referenced.

Since the Value v may be updated and registered, the first management device 701 temporally holds the storage destination of the Value v. When receiving the updated Value v from the client 703, the first management device 701 transmits the Value v together with the key k to the distribution device M3 as the storage destination. As a result, in the distribution device M3, the key k and the updated Value v are stored in the memory device D3.

In case of a deletion request, in the Operation (5), the first management device 701 transmits the deletion request together with the key k to the distribution device M3, and the distribution device M3 deletes the key k and the Value v stored in the memory device D3.

<Example of New Registration of Data>

Figure 12:
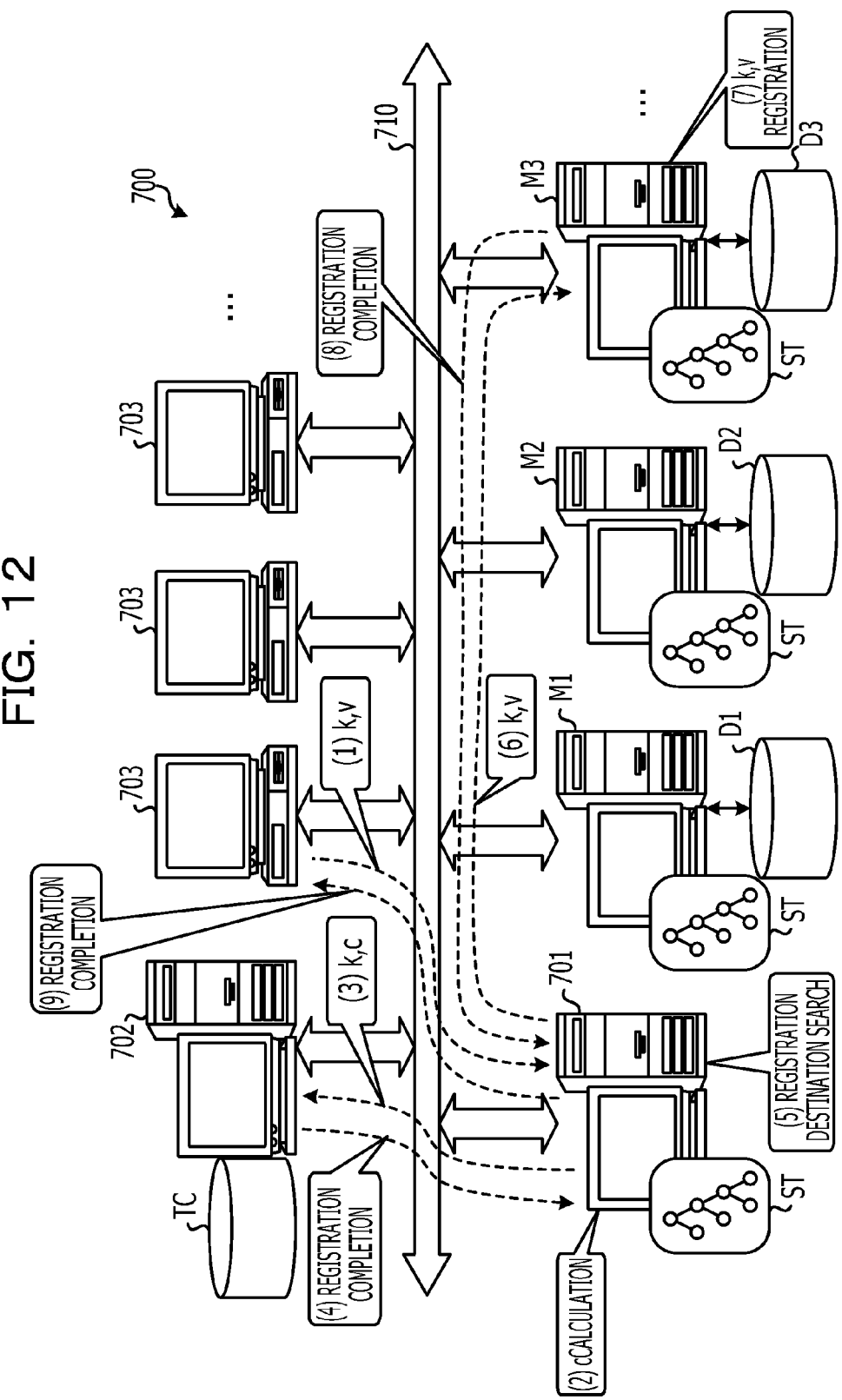
FIG. 12 is an explanatory diagram illustrating an example of a new registration of data.

FIG. 12 is an explanatory diagram illustrating new registration of data.

Operation (1): The client 703 transmits the data registration request that includes the key k and Value v to the first management device 701.

Operation (2): When receiving the data reference request, the first management device 701 calculates the key characteristic value c of the key k by using the key k and another key in the Value v.

Operation (3): The first management device 701 transmits a pair of the key k and the calculated key characteristic value c to the second management device 702.

Operation (4): The second management device 702 adds the received pair of the key k and the key characteristic value c to the key characteristic value table TC and then returns a registration completion notice to the first management device 701.

Operation (5): When receiving the registration completion notice, the first management device 701 specifies the distribution device M as the storage destination of the key k and the Value v by searching in the tree structure data ST with the key characteristic value c. In this case, the distribution device M3 is specified. In this manner, since the distribution device M with the locality is specified at time of new registration, the grouping of the data groups having the locality is achieved.

Operation (6): The first management device 701 transmits the key k and the Value v to the distribution device M3.

Operation (7): The distribution device M3 registers the key k and the Value v in the memory device D3.

Operation (8): If the registration is successful, the distribution device M3 returns the registration completion notice to the first management device 701.

Operation (9): When receiving the registration completion notice from the distribution device M3, the first management device 701 transmits the registration completion notice to the client 703 at the registration request source.

<Example of Functional Structure of Management Device>

Figure 13:
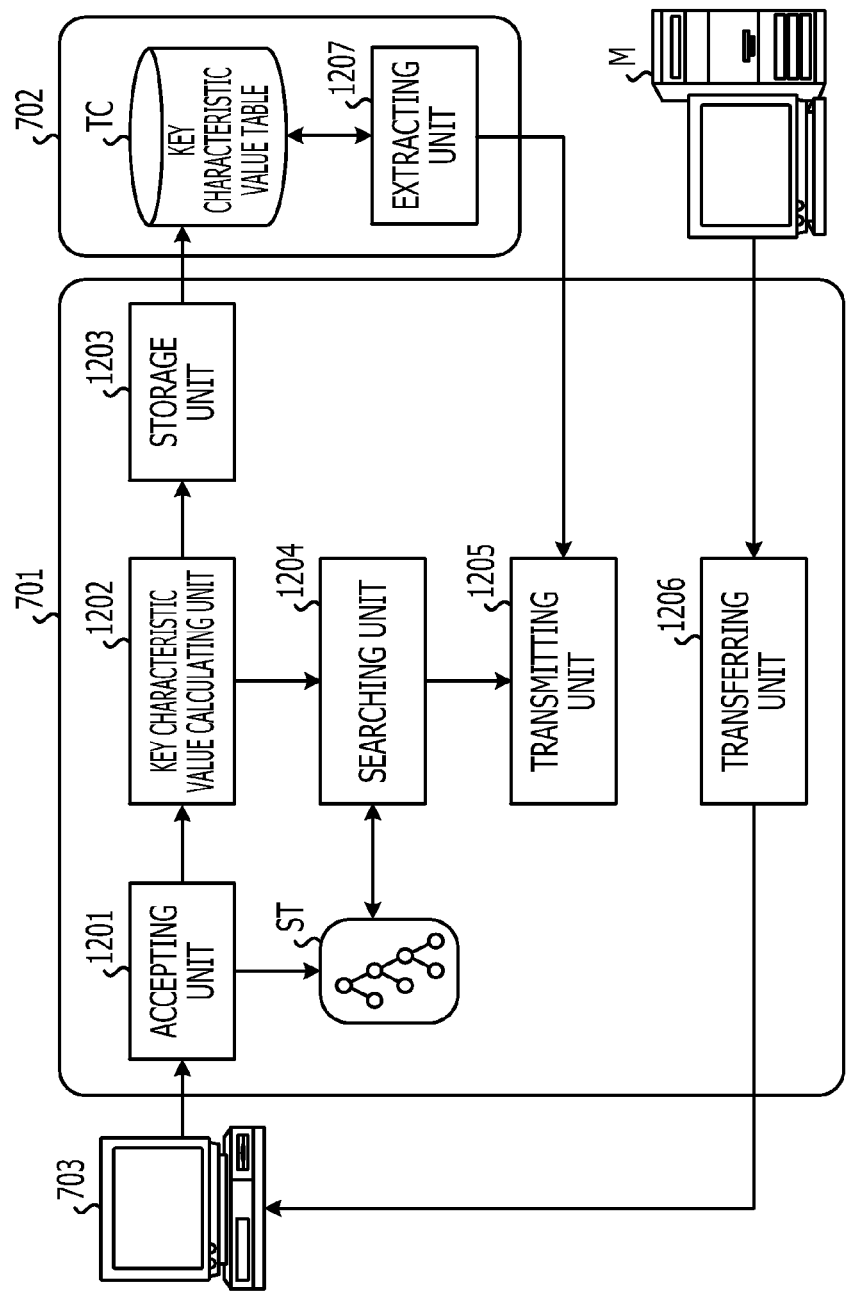
FIG. 13 is a function block diagram illustrating a functional structure example of a first management device 701 and a second management device 702.

FIG. 13 is a function block diagram illustrating an example of a functional structure of the first management device 701 and the second management device 702. The first management device 701 includes an accepting unit 1201, a key characteristic value calculating unit 1202, a storage unit 1203, a searching unit 1204, a transmitting unit 1205, and a transferring unit 1206. The second management device 702 includes an extracting unit 1207. Specifically, the units 1201 to 1207 achieve the functions thereof, for example, by causing the CPU 901 to execute a program stored in a memory device such as the ROM 902, the RAM 903, the magnetic disk 905, and the optical disk 907 or by the I/F 909.

The first management device 701 will be described below. The accepting unit 1201 accepts a request. If the request is a reference request, an update request, or a deletion request, the accepting unit 1201 reads out the key included in the reference request. If the request is a new registration request, the accepting unit 1201 reads out the key or another key in the Value from the data in the registration request. When accepting the latest tree structure data ST from the distribution device M, the accepting unit 1201 stores the data in a memory area.

The key characteristic value calculating unit 1202 calculates the key characteristic value of the data accepted by the accepting unit 1201. The key characteristic value is an index value indicating the existence of the key in the data and the other key included in the Value. The key characteristic value calculating unit 1202 calculates the key characteristic value of the data based on the value of the key and the value of the other key included in the Value. Specifically, as illustrated in FIG. 2, for example, the key characteristic value calculating unit 1202 calculates the key characteristic value of each data by the bloom filter BF. By using the bloom filter BF, the key group in the data may be expressed in the bit width (for example, 128 bits) of the bloom filter BF, so that the size of the data may be reduced while the characteristic of the value of the key included in the data is expressed.

When accepting the key characteristic value calculated by the key characteristic value calculating unit 1202 of the first management device 701 and the key as the calculation source (not the key in the Value), the storage unit 1203 stores the key characteristic value and the key of the calculation source in the key characteristic value table TC of the second management device 702.

The searching unit 1204 searches in the tree structure data ST based on the key characteristic value of the data having the key corresponding to the stored Value and the stored Value and on two subgraph characteristic values corresponding to two segments that are branched in the tree structure data. Specifically, the searching unit 1204 performs segment search, in which the route is transferred to the segment corresponding to the subgraph having the subgraph characteristic value that is closer to the key characteristic value of the stored data, until the two segments that are branched from the segment of the transfer destination no longer exist. For example, the searching unit 1204 performs the search as illustrated in FIG. 7E. When the segment as a leaf in the search is specified, the distribution device M of the storage destination as the data of the calculation source of the key characteristic value used for the search may be specified by referring to the storage destination information of the segment.

The transmitting unit 1205 performs transmission with respect to the distribution device M specified by a searching result by the searching unit 1204. Specifically, for example, in case of the reference request from the client 703, the transmitting unit 1205 transmits the key k as illustrated in FIG. 11. In case of the new registration request from the client 703, the transmitting unit 1205 transmits the key k and the Value v as illustrated in FIG. 12.

The transferring unit 1206 transfers the information transmitted from the distribution device M to the client 703 at the request source of the request. Specifically, for example, in case of the reference request from the client 703, the transferring unit 1206 obtains and transfers the Value v from the distribution device M3 to the client 703 at the reference request source as illustrated in FIG. 11. As illustrated in FIG. 12, in case of the new registration request from the client 703, the transferring unit 1206 transfers the registration completion notice from the distribution device M3 to the client 703 at the registration request source.

The second management device 702 will be described below. When accepting the key from the first management device 701, the extracting unit 1207 refers to the key characteristic value table TC and extracts the key characteristic value corresponding to the accepted key. The extracting unit 1207 gives the extracted key characteristic value to the first management device 701. The given key characteristic value is transmitted by the transmitting unit 1205 of the first management device 701 to the distribution device M obtained by the searching result.

<Example of Functional Structure of Distribution Device M>

Figure 14:
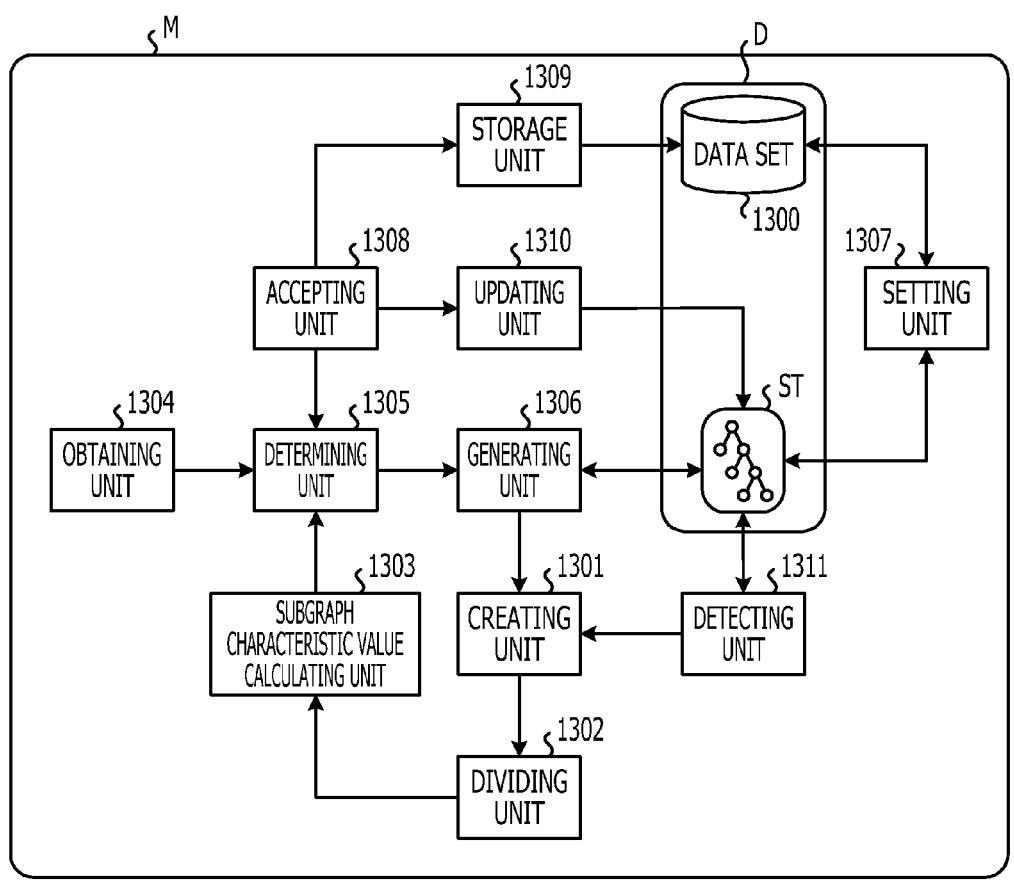
FIG. 14 is a block diagram illustrating a functional structure example of a distribution device M.

FIG. 14 is a block diagram illustrating an example of a functional structure of the distribution device M. The distribution device M includes a creating unit 1301, a dividing unit 1302, a subgraph characteristic value calculating unit 1303, an obtaining unit 1304, a determining unit 1305, a generating unit 1306, a setting unit 1307, an accepting unit 1308, a storage unit 1309, an updating unit 1310, and a detecting unit 1311. Specifically, the units 1301 to 1311 achieve the functions thereof, for example, by causing the CPU 901 to execute the program stored in a memory device such as the ROM 902, the RAM 903, the magnetic disk 905, or the optical disk 907 or by the I/F 909.

Based on a data set 1300 having the key and the Value stored in the memory device D of the distribution device M, the creating unit 1301 creates a graph in which the key is a node and the association of the key and another key in the Value is an edge between the nodes. Specifically, for example, as illustrated in FIG. 1, the creating unit 1301 creates the graph G0 from the segment S0.

The dividing unit 1302 divides the graph created by the creating unit 1301. For example, the dividing unit 1302 divides the graph so that the number of nodes is evenly divided and that the number of edges crossing the border is reduced as much as possible. The dividing unit 1302 evenly divides the number of nodes. However, the numbers are not generally the same within a prescribed allowable range. Due to this, there is a high probability that adjacent nodes that are directly coupled by an edge are assigned to the same subgraph. For example, Kernighan-Lin algorithm and Fiduccia-Mattheyses algorithm are employed for the graph division. In the example illustrated in FIG. 1, the dividing unit 1302 divides the graph G0 into the graph G1 and the graph G2.

Based on the value of each key of the first key group, the subgraph characteristic value calculating unit 1303 calculates the first subgraph characteristic value indicating the existence of the first key group in the first subgraph obtained by the dividing unit 1302. Based on the value of each key of the second key group, the subgraph characteristic value calculating unit 1303 calculates the second subgraph characteristic value indicating the existence of the second key group in the second subgraph obtained by the dividing unit 1302. As illustrated in the example in FIG. 1, the subgraph characteristic value calculating unit 1303 calculates the subgraph characteristic value C (G1) of the subgraph G1 by using the values of keys ka to ke of the subgraph G1. For example, when the bloom filter BF is used as described above, the subgraph characteristic value calculating unit 1303 obtains the hash value of each key by giving the respective values of the keys ka to ke of the subgraph G1 to the same hash function.

The subgraph characteristic value calculating unit 1303 sets a bit in a bit position corresponding to the value of a remainder obtained by dividing each hash value by the bit width of the bloom filter BF. Due to this, in case of the same key, the bit is set in the same bit position. Thus, the existence of the same key is obtained by referring to a common bit in comparison with the key characteristic value. Even though the same key does not always exist because of the false positive of the bloom filter BF, the key group in the subgraph may be expressed by the bit width (for example, 128 bits) of the bloom filter BF when the bloom filter BF is used. Therefore, the size of the data may be reduced while the character of the value of the key in the subgraph is expressed. As with the first subgraph, the subgraph characteristic value of the second subgraph is calculated.

The obtaining unit 1304 obtains the key characteristic value of the data indicating the key in the data and the other key included in the Value for each data inside the data set 1300. Specifically, for example, the obtaining unit 1304 transmits an obtainment request of the key characteristic value to the first management device 701 for each key of each data inside the data set 1300. The obtainment request of the key characteristic value includes the key of each data inside the data set 1300. Therefore, by transmitting the key in the obtainment request to the second management device 702, the first management device 701 receives the key characteristic value for each key in the obtainment request from the second management device 702. After that, the obtaining unit 1304 obtains the key characteristic value for each key in the obtainment request from the first management device 701.

The obtaining unit 1304 may have a function of the key characteristic value calculating unit 1202 of the first management device 701. In this case, the key characteristic value may be obtained in the distribution device M without transmission of the obtainment request to the first management device 701, so that communication load in the distribution system 700 may be reduced.

Based on the key characteristic value and the first and second subgraph characteristic values for each data, the determining unit 1305 determines the segment in which the data is allocated in one of the first segment corresponding to the first segment and the second segment corresponding to the second segment. That is, the determining unit 1305 determines whether the data has the locality with one of the first subgraph and the second subgraph for each data. Specifically, as illustrated in FIGS. 5A and 5B, for example, the determining unit 1305 obtains distances d1 and d2 and then determines whether the data has the locality with one of the first subgraph and the second subgraph. For example, in FIG. 5A, the segment in which the data a is allocated is determined to be the segment Sl. Similarly, in FIG. 5B, the segment in which the data e is allocated is determined to be the segment S2. Although the examples illustrated in FIGS. 5A and 5B indicate distance $d=1/(n+1)$ (n is the number of common bits), the determination may simply depends on the number of common bits n. In this case, the determination indicates that the data has the locality with the subgraph of which the number n of common bits is larger.

The generating unit 1306 generates the segment in which the data blocks with the similar key characteristic values calculated by the key characteristic value calculating unit 1202 are in the same group. Specifically, for example, as illustrated in FIG. 7C, the generating unit 1306 allocates, in the segment determined by the determining unit 1305 from the segment as the division source, the data belonging to the segment as the division source of two segments as the branch destination. Due to this, the tree structure data ST associated with the segment as the division source and the two segments as the branch destination. In the example illustrated in FIG. 7C, the generating unit 1306 divides the segment S into the segment Sr and the segment Sl. In the example illustrated in FIG. 7E, the generating unit 1306 divides the segment Sl into a segment Slr and a segment Sll. As a result, the generating unit 1306 may perform the grouping by the segment to which the data having the locality belongs. Since the data, of which the key characteristic values are close to the subgraph characteristic value, belongs to the same segment, the key characteristic values of the assignment data in the same segment are indirectly similar to each other through the subgraph characteristic value of the segment of the belonging destination.

The setting unit 1307 sets the storage destination of the data in the generated segment. Specifically, for example, the setting unit 1307 sets the storage destination of the assignment data group of one of the two segments as the branch destination to another storage destination in which no assignment data of the segments is stored. The setting unit 1307 transfers the storage destination of the assignment data group of one of the two segments as the branch destination to another storage destination in which no segment or no assignment data is stored. Specifically, for example, the setting unit 1307 sets the storage destination of the data group in one of the two segments generated by the generating unit 1306 to the memory device D of another distribution device M instead of the memory device D of the distribution device M. The setting unit 1307 transfers the data group in one of the two segments to the memory device D of the other distribution device M. That is, the data group of one of the two segments obtained by the segment division remains in the memory device D of the distribution device M. The setting unit 1307 transfers the data group of the other segment to the memory device D of the other distribution device M.

For example, in FIG. 7E, The number of data of the segment Sll is smaller than the number of data of the segment Slr, and the data group specified by the segment Sll is transferred to the memory device D of the other distribution device M. That is, the data group specified by the segment Slr is not generally transferred. In this case, the data group of which the number of data is smaller is transferred. Thus, compared to the case of transferring the data group of which the number of data is larger, the data transfer amount may be reduced, and the efficiency of transferring processing may be improved.

An inquiry may be sent to the first management device 701 to find which distribution device M is the other distribution device M. In this case, the first management device 701 calculates the storage capacity of each distribution device M, and the distribution device M with the largest capacity may become a transfer destination. As for the transferring processing, in instead of the memory device D of the other distribution device M, the memory device D of the distribution device M is used. In this case, the divided segments share the memory area. Even when the assignment of a plurality of segments is performed by the same memory device D, the address of the memory area as well as the address of the distribution device M may be registered as the storage destination information of each segment.

The accepting unit 1308 accepts the registration target data having a registration target key and a registration target Value. Specifically, for example, the accepting unit 1308 accepts a pair of a registration target key k and a registration target Value v as illustrated in FIG. 12 (6). The accepting unit 1308 accepts the deletion request of the data.

When the accepting unit 1308 accepts the registration target data, the storage unit 1309 stores the registration target data in the data set 1300. On the other hand, when the deletion request is accepted, the storage unit 1309 deletes the deletion target data from the data set 1300.

As for the leaves in the tree structure data ST, the updating unit 1310 updates the number of data of an assignment leaf that specifies the data set 1300 stored in the memory device D of the distribution device M. Here, the assignment leaf is a segment that specifies the distribution device M based on the storage destination information. When the accepting unit 1308 accepts the registration target data, the updating unit 1310 increases the number of data of the assignment leaf by one. On the other hand, when the accepting unit 1308 accepts the deletion request, the data (the pair of the key and the Value) is deleted from the data set 1300. Thus, the updating unit 1310 decreases the number of data of the assignment leaf by one.

As a result of the update by the updating unit 1310, the detecting unit 1311 detects that the number of data of the assignment leaf reaches a threshold value. The threshold value is the upper limit of the number of data in the segment. In the examples illustrated in FIGS. 7A, 7B, 7C, 7D, and E, the upper limit of the number of data is "10." When the detection indicates that the number of data reaches the threshold value, the creating unit 1301 creates a graph. Due to this, the graph division, the calculation of the subgraph characteristic value, the obtainment of the key characteristic value, the determination of the locality, and the segment division are performed, and the segment division is recursively performed.

<Reference Request Processing by First Management Device 701>

Figure 15:
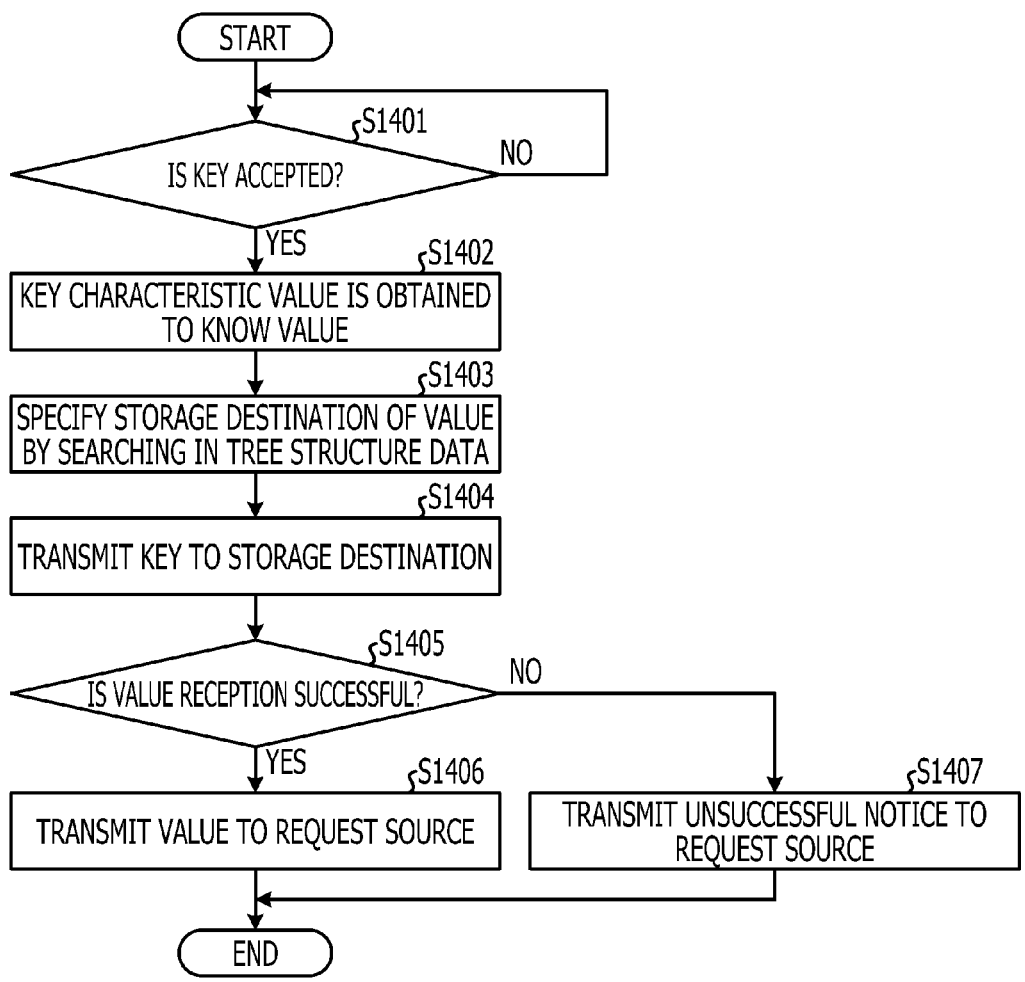
FIG. 15 is a flowchart illustrating a detailed processing procedure of reference request processing by the first management device 701.

FIG. 15 is a flowchart illustrating a detailed processing procedure of reference request processing by the first management device 701. The first management device 701 waits for acceptance of the key as the reference request from the client 703 (No in Operation S1401). When the key is accepted (YES in Operation S1401), the first management device 701 transmits the accepted key to the second management device 702, and then obtains the key characteristic value corresponding to the key from the second management device 702 (Operation S1402).

The first management device 701 searches in the tree structure data ST with the obtained key characteristic value from the route and specifies the storage destination of the Value corresponding to the accepted key (Operation S1403). The first management device 701 transmits the accepted key to the distribution device M as the specified storage destination (Operation S1404). Accordingly, the distribution device M as the storage destination extracts the Value corresponding to the received key and then returns the Value to the first management device 701.

The first management device 701 determines whether the Value is received from the distribution device M as the storage destination (Operation S1405). If the Value is received within a prescribed period of time, for example, the reception is successful. If the reception is successful (YES in Operation S1405), the first management device 701 transmits the received Value to the client 703 that sent the reference request (Operation S1406). If the reception is unsuccessful (NO in Operation S1405), the first management device 701 transmits an unsuccessful notice to the client 703 that sent the reference request (Operation S1407). Therefore, a sequence of the reference request processing ends. As illustrated in the flowchart in FIG. 15, when the key is given to the client 703, the client 703 may obtain the corresponding Value.

<New Registration Request Processing by First Management Device 701>

Figure 16:
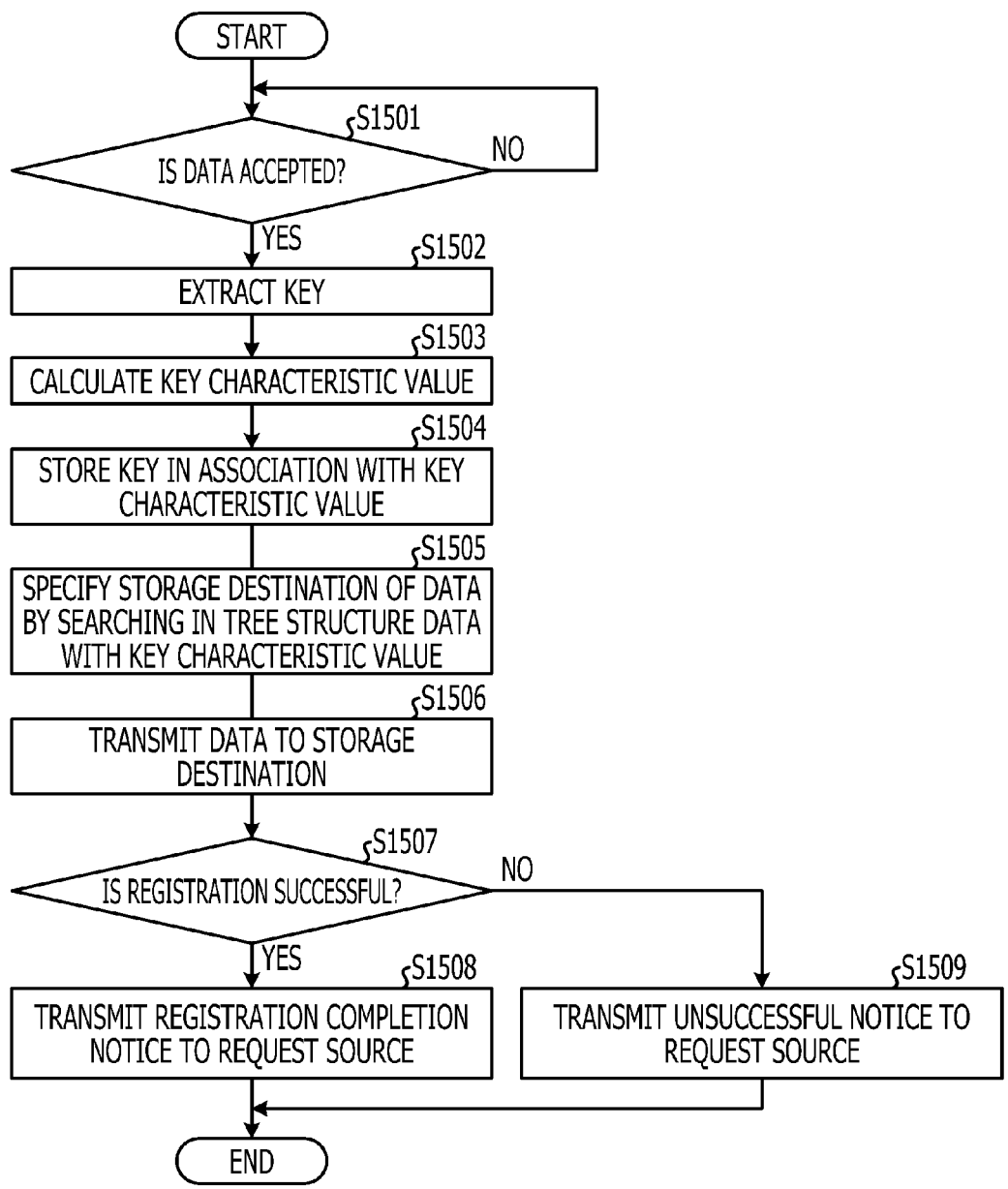
FIG. 16 is a flowchart illustrating a detailed processing procedure of new registration request processing by the first management device 701.

FIG. 16 is a flowchart illustrating a detailed processing procedure of new registration request processing by the first management device 701. The first management device 701 waits for acceptance of the data as the new registration request from the client 703 (NO in Operation S1501). If the data is accepted (YES in Operation S1501), the first management device 701 extracts the key group from the accepted data (Operation S1502). Here, another key included in the Value is extracted as well. The first management device 701 calculates the key characteristic value by using the extracted key group (Operation S1503). The first management device 701 transmits the key of the data associated with the key characteristic value to the second management device 702 and then stores the key and the key characteristic value in the key characteristic value table TC of the second management device 702 (Operation S1504). Due to this, even when the reference request is sent, the key characteristic value may be obtained.

The first management device 701 searches in the tree structure data ST with the calculated key characteristic value to specify the distribution device M as the storage destination of the accepted data (Operation S1505). The first management device 701 transmits the accepted data to the distribution device M as the storage destination (Operation S1506). Accordingly, the distribution device M as the storage destination accepts the transmitted data and then stores the data in the memory device D. The distribution device M increases the number of data in the assignment leaf by one in the tree structure data ST. The distribution device M as the storage destination stores the data in the memory device D. When the increase of the number of nodes is completed, the distribution device M returns the registration completion notice to the first management device 701.

The first management device 701 determines whether the registration completion notice is received from the distribution device M as the storage destination (Operation S1507). If the registration completion notice is received within the prescribed period of time, the registration is successful. If the registration is successful (YES in Operation S1507), the first management device 701 transmits the received registration completion notice to the client 703 that sent the new registration request (Operation S1508). If the registration is unsuccessful (NO in Operation S1507), the first management device 701 transmits the unsuccessful notice to the client 703 that sent the new registration request (Operation S1509). Therefore, the sequence of the new registration request processing ends. As illustrated in the flowchart in FIG. 16, if the data is given to the client 703, the client 703 may register the data in the memory device D of which the locality is high.

<Local Division Processing by Distribution Device M>

Figure 17:
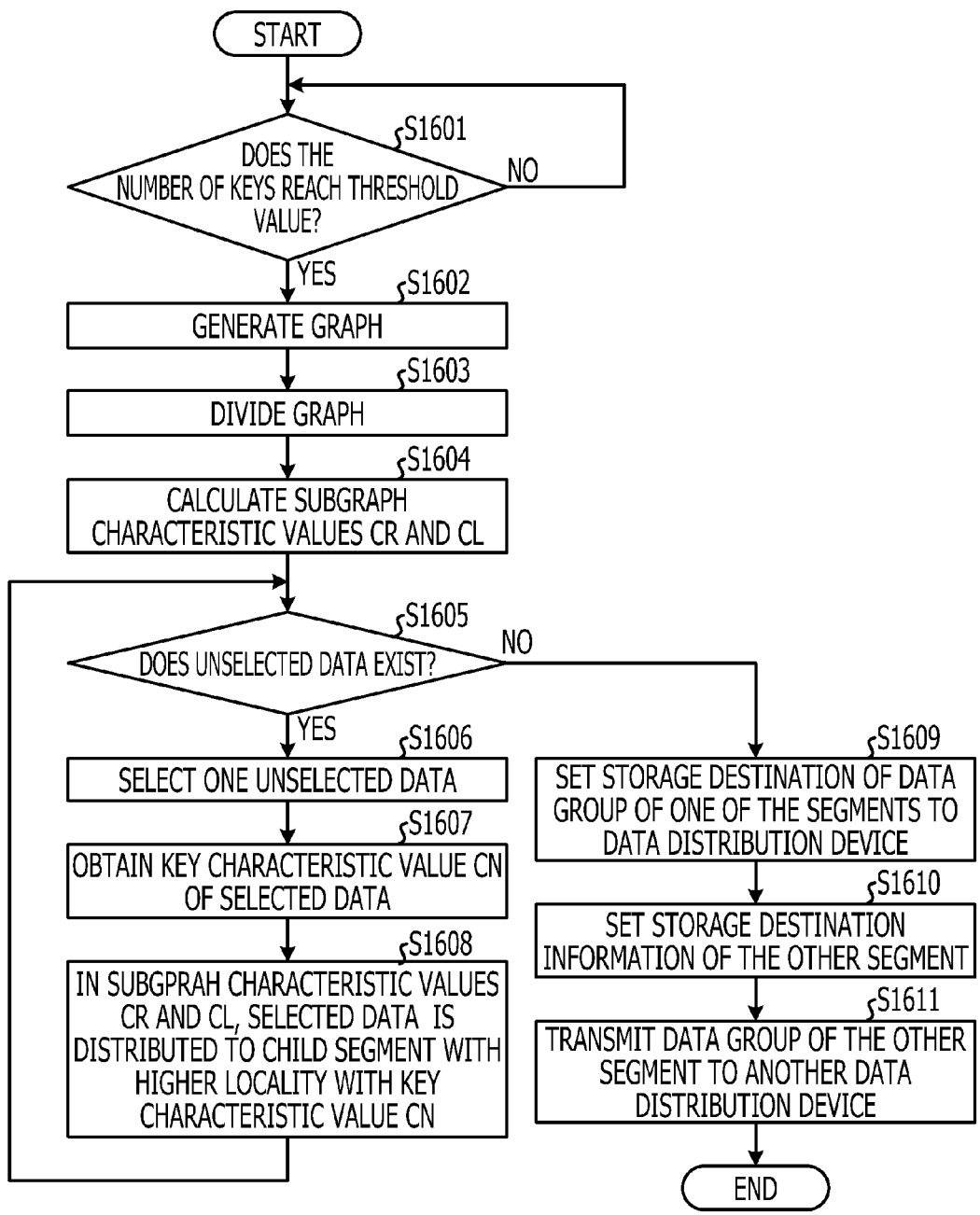
FIG. 17 is a flowchart illustrating a detailed processing procedure of local dividing processing by the distribution device M.

FIG. 17 is a flowchart illustrating a detailed processing procedure of local division processing by the distribution device M. The distribution device M waits until the number of data of the assignment leaf reaches the threshold value (NO in Operation S1601). When the number of data reaches the threshold value (YES in Operation S1601), the distribution device M generates a graph (Operation S1602) and divides the generated graph (Operation S1603). The distribution device M calculates the subgraph characteristic value for each subgraph (Operation S1604). In this case, the subgraph characteristic values Cr and Cl are calculated.

The distribution device M determines whether the memory device D has unselected data (Operation S1605). If yes (YES in Operation S1605), the distribution device M selects one of the unselected data (Operation S1606). The distribution device M obtains the key characteristic value for the unselected data (Operation S1607). In this case, the key characteristic value Cn is obtained.

In the subgraph characteristic values Cr and Cl, the distribution device M distributes the selected data to a child segment with higher locality with the key characteristic value Cn (Operation S1608). The process goes back to Operation S1605. By repeating the loop starting from Operation S1605: YES until Operation S1608, the data is distributed to two child segments that are divided from the assignment leaf.

If the distribution device M has no unselected data (NO in Operation S1605), the distribution device M sets the storage destination of the data group belonging to one of the segments to the distribution device M (Operation S1609). That is, the distribution device M has the storage destination information of one of the segments as an address of the distribution device M, deletes the storage destination information of the assignment leaf, and has "0" as the number of data. Due to this, one of the segments becomes another assignment leaf. The data group of one of the segments is stored in the memory device D.

The distribution device M sets the storage destination information of the data group of another child segment to the other distribution device M (Operation S1610). The distribution device M transmits the data group of the other child segment to the other distribution device to which the storage destination information is set (Operation S1611). Therefore, the data transfer by the local division is completed.

As described above, according to the embodiment, the detection of the relevance of the data based on the combination of the keys in the data enables the grouping of the data having the relevance. Specifically, by assigning the data blocks to one group by using the locality of the data blocks that have no relevance of the value of the key and the attribute of the key, the grouping of the data having the relevance may be performed. For example, even when the size of the value of the key has no relevance or when the attributes such as a gender and an occupation are not associated with the keys, the grouping of the data having the locality may be achieved.

Since the graph division is performed in such a way that the number of nodes is evenly divided and the number of edges crossing the border becomes minimum, the adjacent nodes that are directly coupled to each other with the edge may be assigned to the same subgraph with a high probability.

Regarding the calculation of the subgraph characteristic value, the memory may be minimized by making the size of the subgraph characteristic value smaller than the size of the key group as the calculation source of the subgraph characteristic value. Specifically, by using the bloom filter BF, no matter which key is related, that is, even if the value of the other key is unknown, the data has the locality.

Further, by using the bloom filter BF, the characteristic value obtained by condensing a plurality of keys (the key characteristic value and the subgraph characteristic value) may be obtained, and memory may be reduced more than a case where the plurality of keys is stored. Since the value of the key is not known according to the characteristic value, no access to the memory device D is made by using the value of the key. That is, simply by the access to the memory device D that is finally searched by the tree structure data, the data may be obtained. Due to this, the access to the memory device D until the data is searched may be reduced.

By transferring the data group of one of the local-divided segments to another distribution device, the distribution device group may be divided by the segment. For example, if the conventional distributed Key-Value Store is employed, the corresponding server is determined based on the hash value of the key. Thus, the adjacent data blocks on the graph are allocated in different servers. Due to this, if the adjacent data blocks on the graph are sequentially accessed, a cache is ineffective because the data blocks are in different servers. This causes seek in the respective disks.

On the contrary, according to the embodiment, the adjacent data blocks on the graph illustrated in FIG. 1 have a high probability of being assigned to the same distribution device. Therefore, the cost of the entire data access may be reduced. For example, a single communication is performed for data access, or a single disk access is performed.

At time of the data transfer by the local division, by transferring the segment with fewer assigned assignment data groups, the communication amount with associated with the data transfer may be reduced, and a writing amount in the memory device D of the distribution device M as the transfer destination may be reduced.

When the registration request of the data is transmitted from the client, the data is automatically assigned to the segment with a high locality by the local division. Therefore, the client does not generally consider "whether the assignment to the distribution device is most appropriate." Accordingly, the appropriate data registration may be simply performed.

By calculating the key characteristic value for each data block, the existence of the key in the data and another key included in the Value may be characterized for each data block. Regarding the calculation of the key characteristic value, the memory may be minimized by making the size of the key characteristic value smaller than the size of the key group as the calculation source of the key characteristic value. Especially, by using the bloom filter BF, no matter which key is related, that is, even if the value of the other key is unknown, the keys are in the same data.

By searching in the tree structure data, which is recursively structured, with the key character value, the distribution device at the storage destination may be specified. As a result, by transmitting the data to be registered in the specific distribution device, the grouping of the data having a high locality may be achieved.

To refer to the data, the distribution device at the reference destination may be specified by the similar search. The data blocks of which the keys exist in the Value are stored in the memory device of the same distribution device due to the locality. Thus, the cost of the data access may be reduced.

The upper limit of the number of data to be assigned is set with respect to each segment. By performing the data registration with respect to the corresponding segment until the number of data reaches the upper limit, the grouping of the data having the locality may be achieved by the same segment. When the number of data reaches the upper limit, the local division may suppress the variation of the locality associated with an increase of the data.

If the local division is performed every time the number of data reaches the upper limit, the tree structure data ST may be recursively structured. The local division is performed by the respective distribution devices, so that the load distribution may be performed compared to a case where the local division is performed by a single device. When the tree structure data ST is updated by the increase/decrease of the data or the local division, the difference of the tree structure data ST between the devices may be eliminated by distributing the latest tree structure data ST to the other distribution device or the first management device 701.

The distribution may be performed immediately after the update. When the data registration request or the reference request is transmitted to the distribution device in the first management device 701, the respective devices may request the tree structure data ST if the acceptance of the data is unsuccessful. In this case, when the respective distribution devices transmit the difference data before and after the update to the first management device 701, the first management device 701 may structure the latest tree structure data ST. After the first management device 701 structures the latest tree structure data ST, the latest tree structure data ST is typically distributed to the distribution device group.

According to the above-described embodiment, the assignment data group of a single segment is stored in the memory device of a single distribution device. However, the memory device of a single distribution device may store the data groups of a plurality of segments.

The distributing method described in the embodiments may be achieved by causing a computer such as a personal computer or a work station to execute a program that is prepared in advance. The present program is recorded in a computer-readable recording medium such as a hard disk, a flexible disk, a CD-ROM, an MO, and a DVD and is then read out from the recording medium by the computer. The present program may be distributed through a network such as the Internet.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A non-transitory computer-readable recording medium storing a program that causes an apparatus to execute a procedure, the apparatus configured to store a distributed Key-Value Store type database including a plurality of data, each of the plurality of data including a key having numerical information as an identifier and a value indicating data to be stored corresponding to the key, the procedure comprising:

extracting, for each of the plurality of data, numerical information of another key included in the value corresponding to the key;

calculating, for each of the plurality of data, a key characteristic value for the key using the extracted numerical information of another key and numerical information for the key;

grouping the plurality of data having similar key characteristic values into a plurality of groups;

setting a storage destination for each of the plurality of groups;

accepting an obtainment request which includes the key corresponding to the stored value from a request source;

based on the key characteristic value of the data having the key corresponding to the stored value and the stored value and on two graph characteristic values corresponding to two segments which are branched in a tree structure data, performing segment search until the two segments branched from the segment of the transfer destination no longer exist;

obtaining the stored value by using the key corresponding to the stored value from the storage destination of an assignment data group which belongs to the searched segment; and transferring the stored value to the request source.

2. The non-transitory computer-readable recording medium according to claim 1, the procedure further comprising:

creating a graph in which the key included in the plurality of data is a node and relation between the key and the another key included in the value corresponding to the key is an edge;

dividing the created graph into a first graph and a second graph;

calculating a first graph characteristic value indicating the existence of a first key group in the divided first graph based on the value of each key of the first key group and calculating a second graph characteristic value indicating the existence of a second key group in the divided second graph based on the value of each key of the second key group;

wherein the grouping includes:

determining, for each of the plurality of data, one of a first segment corresponding to the first graph and a second segment corresponding to the second graph to be a segment in which the data is allocated, based on the key characteristic value and the first and second graph characteristic values; and a tree structure data in which the segment corresponding to the graph is associated with the first and second segments by allocating the data in the segment determined by the determining from the segment corresponding to the data.

3. The non-transitory computer-readable recording medium according to claim 2, wherein the dividing includes dividing the created graph into a first graph and a second graph in such a way that a number of nodes of the first graph and the number of nodes of the second graph are even and that the number of edges crossing a border is minimized.

4. The non-transitory computer-readable recording medium according to claim 2, wherein the calculating of the first and second graph characteristic values includes:

calculating the first graph characteristic value which is smaller than a size of the first key group and calculating the second graph characteristic value which is smaller than the size of the second key group.

5. The non-transitory computer-readable recording medium according to claim 4,
wherein the calculating of the first and second graph characteristic values includes calculating the first and second graph characteristic values based on a bloom filter.

6. The non-transitory computer-readable recording medium according to claim 2,
wherein the setting includes setting the storage destination of an assignment data group of one of the first segment and the second segment to another storage destination in which no assignment data of the segments is stored.

7. The non-transitory computer-readable recording medium according to claim 6, wherein the assignment data group of one of the first segment and the second segment is transferred to the other storage destination in which no assignment data of the segments is stored.

8. The non-transitory computer-readable recording medium according to claim 2, wherein based on the key characteristic value of a registration target data having a registration target key and a registration target value corresponding to the registration target key and on the first and second graph characteristic values, the determining determines one of the first segment corresponding to the first graph and the second segment corresponding to the second graph to be the segment in which the data is allocated.

9. The non-transitory computer-readable recording medium according to claim 8, the procedure further comprising:
detecting that the number of data of the assignment data group of one of the first segment and the second segment reaches a threshold value;
dividing the graph corresponding to the detected segment into a third graph and a fourth graph;
calculating a third graph characteristic value indicating the existence of a third key group in the divided third graph based on the value of each key of the third key group and to calculate a fourth graph characteristic value indicating the existence of a fourth key group in the divided fourth graph based on the value of each key of the fourth key group;
determining one of a third segment corresponding to the third graph and a fourth segment corresponding to the fourth graph to be the segment, in which the assignment data is allocated, based on the key characteristic value of the assignment data and on the third and fourth graph characteristic values, for each of the assignment data of the assignment data group of the detected segment; and
creating tree structure data in which the segment corresponding to the graph is associated with the first and second segments and the detected segment is associated with the third and fourth segments.

10. The non-transitory computer-readable recording medium according to claim 9, wherein the setting sets the storage destination of the assignment data group of one of the third segment and the fourth segment to another storage destination in which no assignment data of the segments is stored.

11. The non-transitory computer-readable recording medium according to claim 2, wherein the determining includes:
calculating, for each of the plurality of data, a first distance between the key characteristic value and the first graph characteristic value;
calculating, for each of the plurality of data, a second distance between the key characteristic value and the second graph characteristic value; and
determining one of the first segment and second segment based on a comparison result between the first distance and the second distance.

12. A generation method executed by a processor included in an apparatus, the processor being coupled to a distributed Key-Value Store type database configured to store a plurality of data, each of the plurality of data including a key having numerical information as an identifier and a value indicating data to be stored corresponding to the key, the generation method comprising:
extracting, for each of the plurality of data, numerical information of another key included in the value corresponding to the key;
calculating, for each of the plurality of data, a key characteristic value for the key using the extracted numerical information of another key and numerical information of the key;
grouping the plurality of data having similar key characteristic values into a plurality of groups;
setting a storage destination for each of the plurality of groups;
accepting an obtainment request which includes the key corresponding to the stored value from a request source;
based on the key characteristic value of the data having the key corresponding to the stored value and the stored value and on two graph characteristic values corresponding to two segments which are branched in a tree structure data, performing segment search until the two segments branched from the segment of the transfer destination no longer exist;
obtaining the stored value by using the key corresponding to the stored value from the storage destination of an assignment data group which belongs to the searched segment; and
transferring the stored value to the request source.

13. The generation method according to claim 12, further comprising:
creating a graph in which the key included in the plurality of data is a node and relation between the key and the another key included in the value corresponding to the key is an edge;
dividing the created graph into a first graph and a second graph;
calculating a first graph characteristic value indicating the existence of a first key group in the divided first graph based on the value of each key of the first key group and calculating a second graph characteristic value indicating the existence of a second key group in the divided second graph based on the value of each key of the second key group;
wherein the grouping includes:
determining, for each of the plurality of data, one of a first segment corresponding to the first graph and a second segment corresponding to the second graph to be a segment in which the data is allocated, based on the key characteristic value and the first and second graph characteristic values; and
generating a tree structure data in which the segment corresponding to the graph is associated with the first and second segments by allocating the data in the segment determined by the determining from the segment corresponding to the data.

14. The generation method according to claim 13, wherein the dividing includes dividing the created graph into a first graph and a second graph in such a way that a number of nodes of the first graph and the number of nodes of the second graph are even and that the number of edges crossing a border is minimized.

15. The generation method according to claim 13, wherein the calculating of the first and second graph characteristic values includes:
    calculating the first graph characteristic value which is smaller than a size of the first key group and
    calculating the second graph characteristic value which is smaller than the size of the second key group.

16. The generation method according to claim 13,
    wherein the setting includes setting the storage destination of an assignment data group of one of the first segment and the second segment to another storage destination in which no assignment data of the segments is stored.

17. The generation method according to claim 13, wherein based on the key characteristic value of a registration target data having a registration target key and a registration target value corresponding to the registration target key and on the first and second graph characteristic values, the determining determines one of the first segment corresponding to the first graph and the second segment corresponding to the second graph to be the segment in which the data is allocated.

18. An information processing apparatus comprising:
    a memory configured to store a distributed Key-Value Store type database including a plurality of data, each of the plurality of data including a key having numerical information as an identifier and a value indicating data to be stored corresponding to the key, and
    a processor coupled to the memory and configured to:
        extract, for each of the plurality of data, numerical information of another key included in the value corresponding to the key;
        calculate, for each of the plurality of data, a key characteristic value for the key using the extracted numerical information of another key and numerical information of the key;
        group the plurality of data having similar characteristic values into a plurality of groups;
        set a storage destination for each of the plurality of groups;
        accept an obtainment request which includes the key corresponding to the stored value from a request source;
        based on the key characteristic value of the data having the key corresponding to the stored value and the stored value and on two graph characteristic values corresponding to two segments which are branched in a tree structure data, perform segment search until the two segments branched from the segment of the transfer destination no longer exist;
        obtain the stored value by using the key corresponding to the stored value from the storage destination of an assignment data group which belongs to the searched segment; and
        transfer the stored value to the request source.

* * * * *